United States Patent
Jivraj et al.

(10) Patent No.: US 11,663,603 B2
(45) Date of Patent: *May 30, 2023

(54) SYSTEMS AND METHODS FOR PROVIDING MERCHANT FRAUD ALERTS

(71) Applicant: The Toronto-Dominion Bank, Toronto (CA)

(72) Inventors: Salim Jivraj, Mississauga (CA); Lauren Van Heerden, Bedford, NH (US); Michael D. Cummins, Mississauga (CA); Prabaharan Sivashanmugan, Farmington Hills, MI (US); Gerald Jeschke, Mississauga (CA); Andrew Chak, Mississauga (CA); Mike Stephenson, Mississauga (CA); Paul Mon-Wah Chan, Markham (CA); John Jong Suk Lee, Waterloo (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 646 days.

This patent is subject to a terminal disclaimer.

(21) Appl. No.: 16/560,013

(22) Filed: Sep. 4, 2019

(65) Prior Publication Data

US 2019/0392452 A1    Dec. 26, 2019

Related U.S. Application Data

(63) Continuation of application No. 14/723,331, filed on May 27, 2015, now Pat. No. 10,438,206.

(Continued)

(51) Int. Cl.
*G06Q 20/40* (2012.01)
*G06Q 20/32* (2012.01)

(52) U.S. Cl.
CPC ....... *G06Q 20/4016* (2013.01); *G06Q 20/322* (2013.01)

(58) Field of Classification Search
CPC .... G06Q 20/4016; G06Q 20/20; G06Q 30/02; G06Q 20/10; G06Q 30/0609
See application file for complete search history.

(56) References Cited

U.S. PATENT DOCUMENTS 7,620,592 B2   11/2009  O'Mara et al.
7,899,712 B2    3/2011  May et al.
(Continued)

FOREIGN PATENT DOCUMENTS

WO   WO-2012106655 A2 *  8/2012  ........... G06Q 20/386
WO   WO 2013122840       8/2013

OTHER PUBLICATIONS

"MasterCard Introduces New Tool that Predicts the Potential for eCommerce Fraud in Real Time," published at http://newsroom.mastercard.com on Mar. 28, 2012 (2 pages).

(Continued)

*Primary Examiner* — Hao Fu
(74) *Attorney, Agent, or Firm* — Duane Morris LLP

(57) ABSTRACT

Mobile communications devices, systems and methods are provided for identifying a risk of fraudulent activity associated with a merchant before a user executes a transaction with the merchant. In an embodiment, a mobile communications device obtains first information identifying prior instances of fraudulent activity associated with a merchant. The mobile communications device may determine a level of risk of fraudulent activity associated with the merchant based on the obtained first information, and may identify, based on the determined risk level, one or more payment instruments and associated incentives appropriate for financial services transactions involving the merchant. The mobile communications device may present, to a user, a (Continued)

notification including the identified payment instruments and associated incentives prior to execution of a transaction between the user and the merchant.

20 Claims, 13 Drawing Sheets

Related U.S. Application Data

(60) Provisional application No. 62/003,466, filed on May 27, 2014.

(56) References Cited

U.S. PATENT DOCUMENTS

| | | |
|---|---|---|
| 8,036,967 B2 | 10/2011 | Adams |
| 8,086,525 B2 | 12/2011 | Atwood et al. |
| 8,456,069 B2 | 6/2013 | Adjaoute |
| 8,600,873 B2 | 12/2013 | Fisher |
| 8,626,663 B2 | 1/2014 | Nightengale et al. |
| 8,725,597 B2 | 5/2014 | Mauseth et al. |
| 2003/0225651 A1 | 12/2003 | Chen |
| 2005/0080716 A1 | 4/2005 | Belyi |
| 2006/0064374 A1 | 3/2006 | Helsper et al. |
| 2007/0073618 A1* | 3/2007 | Yu ............... G06Q 30/0609 705/40 |
| 2009/0112766 A1 | 4/2009 | Hammad et al. |
| 2010/0070405 A1 | 3/2010 | Joa et al. |
| 2010/0169192 A1 | 7/2010 | Zoldi et al. |
| 2010/0325035 A1 | 12/2010 | Hilgers et al. |
| 2011/0187642 A1 | 8/2011 | Carlson et al. |
| 2011/0225076 A1 | 9/2011 | Wang et al. |
| 2011/0238564 A1* | 9/2011 | Lim ............... G06Q 20/3223 705/38 |
| 2012/0158585 A1 | 6/2012 | Ganti |
| 2012/0209773 A1 | 8/2012 | Ranganathan |
| 2012/0221470 A1 | 8/2012 | Lyon |
| 2012/0284105 A1 | 11/2012 | Li |
| 2012/0310836 A1 | 12/2012 | Eden et al. |
| 2013/0006836 A1 | 1/2013 | Howard et al. |
| 2013/0024300 A1 | 1/2013 | Choudhuri et al. |
| 2013/0041821 A1 | 2/2013 | Kingston et al. |
| 2013/0103577 A1 | 4/2013 | Lawson et al. |
| 2013/0218463 A1 | 8/2013 | Howard et al. |
| 2013/0218758 A1 | 8/2013 | Koenigsbrueck et al. |
| 2013/0218765 A1 | 8/2013 | Hammad et al. |
| 2013/0232074 A1 | 9/2013 | Carlson et al. |
| 2013/0297464 A1 | 11/2013 | Jacquez et al. |
| 2013/0346142 A1 | 12/2013 | Young |
| 2014/0006183 A1 | 1/2014 | Grigg et al. |
| 2014/0006272 A1* | 1/2014 | Calman ............... G06Q 20/20 705/40 |
| 2014/0058860 A1 | 2/2014 | Roh et al. |
| 2014/0122325 A1 | 5/2014 | Zoldi et al. |
| 2014/0129441 A1 | 5/2014 | Blanco et al. |
| 2014/0136432 A1 | 5/2014 | Fallows |
| 2014/0156434 A1 | 6/2014 | Murphy et al. |
| 2014/0188728 A1 | 7/2014 | Dheer et al. |
| 2015/0161609 A1* | 6/2015 | Christner ............ G06Q 20/4016 705/44 |
| 2015/0193775 A1* | 7/2015 | Douglas ............. G06Q 20/4016 705/14.23 |

OTHER PUBLICATIONS

Ultveit-Moe et al., "Mobile security with location-aware role-based access control," Lecture Notes of the Institute for Computer Sciences, Social-Informatics and Telecommunications Engineering, v. 94 LNICST, pp. 172-183 (2012).

"G2 Web Services Launches New Operation Choke Point Solutions," published at http://www.g2webservices.com on May 8, 2014 (2 pages).

"Merchant Risk Scoring," retrieved from http://www.bridgeI2i.com/risk-scoring.html, 2012 (3 pages).

Carelli, "Consumer-Controlled Fraud Prevention: The Future," published at http://www.paymentsleader.com on Feb. 4, 2013 (2 pages).

Groenfeldt, "BillGuard Offers Free Card Fraud App for Mobile Phones," published at http://www.forbes.com on Feb. 11, 2014 (3 pages).

Bruene, "BillGuard's Monthly Credit/Debit Card Scan Report," published at http://www.netbanker.com on Oct. 5, 2011 (2 pages).

"Merchant Card Monitoring Program," retrieved on Aug. 18, 2014 from http://www.cashflows.com (4 pages).

\* cited by examiner

| 602 | 604 | 606 |
|---|---|---|
| Low Risk | No restriction on payment instrument, including credit, debit, and pre-paid gift cards | No incentives |
| Medium Risk | Cash, pre-paid gift cards, or credit cards; no debit cards | 1% discount on purchases made using cash or pre-paid gift cards |
| High Risk | Cash, pre-paid gift cards, or credit cards with enhanced fraud protections | 2% discount on purchases made using cash or pre-paid gift cards |
| Extremely High Risk | Card or pre-paid gift cards | 4% discount on purchases made using cash or pre-paid gift cards |

SYSTEMS AND METHODS FOR PROVIDING MERCHANT FRAUD ALERTS

CROSS-REFERENCE TO RELATED APPLICATION

This application is a continuation of and claims the benefit of priority to U.S. application Ser. No. 14/723,331, filed May 27, 2015, which claims the benefit of priority to U.S. Provisional Patent Application No. 62/003,466, filed May 27, 2014, the disclosures of which are both expressly incorporated herein by reference to their entireties.

BACKGROUND

Technical Field

The present disclosure generally relates to systems and methods for identifying risks of future fraudulent activity based on prior instances of merchant fraud, and more particularly, and without limitation, to systems and methods for that provide customers with information identifying risks of future fraudulent activity associated with merchants.

Background

Today, customers routinely purchase goods and services from merchants using non-cash payment instruments, such as credit cards and debit cards. Financial institutions and other issuers of such non-cash payment instruments rarely inform their customers of a risk of fraudulent activity associated with a potential transaction involving a specific merchant. Indeed, customers often become aware of the potential for such fraudulent activities only after they become victims of illegal card skimming or an unauthorized use of a credit or debit card. With information identifying the risks of potential merchant fraud, customers may select merchants and specific payment instruments that reduce their exposure to fraudulent activities. Aspects of the disclosed embodiments address these and other concerns regarding risks of fraudulent activity associated with merchants and/or financial transactions.

SUMMARY

The disclosed embodiments include mobile communications devices, systems, and methods that, among other things, passively monitor a geographic position of a customer and, without input from the customer, automatically notify the customer of a risk of fraudulent activity associated with a merchant before the customer initiates a financial transaction involving the merchant.

In one embodiment, a mobile communications device includes a memory storing software instructions and one or more processors. The one or more processors may be configured to execute the software instructions to perform operations including obtaining first information indicative of one or more prior instances of fraudulent activity involving a merchant, and determining a risk level associated with a merchant based the obtained first information. In some aspects, the risk level may be indicative of a probability of future instances of fraudulent activity involving the merchant. The one or more processors may be further configured to perform operations including identifying one or more payment instruments based on the determined risk. In some aspects, the identified payment instruments may be appropriate for a financial services transaction involving the merchant. The one or more processors may be further configured to perform operations including presenting, to a user via a corresponding interface, a notification comprising the identified payment instruments.

In further embodiments, a system includes a memory storing software instructions and one or more processors. The one or more processors may be configured to execute the software instructions to perform operations including obtaining first information identifying a prior instance of fraudulent activity involving a merchant, and determining a risk level associated with a merchant based the obtained first information. In some aspects, the risk level being indicative of a probability of future instances of fraudulent activity involving the merchant. The one or more processors may be further configured to perform operations including identifying one or more payment instruments based on the determined risk level. In certain aspects, the identified payment instruments may be held by the user and being appropriate for financial service transactions involving the merchant. The one or more processors may be further configured to perform operations including generating information alerting a user to the determined risk level and the identified payment instruments, and transmitting the generated information to a device of the user. In further aspects, the user device may be configured to present at least a portion of the identified payment instruments to the user prior through a corresponding interface.

In additional embodiments, a computer-implemented method includes obtaining, by one or ore processors, first information identifying a prior instance of fraudulent activity involving a merchant, and determining, by the one or more processors, a risk level associated with the merchant based on the obtained first information. In some aspects, the risk level may be indicative of a probability of future instances of fraudulent activity involving the merchant. The method may also include identifying, by the one or more processors, one or more payment instruments based on the determined risk level. In further aspects, the identified payment instruments may be held by the user and being appropriate for financial service transactions involving the merchant. The method may generate, by the one or more processors, information alerting a user to the determined risk level and the identified payment instruments, and may transmit, by the one or more processors, the generated information to a device of the user. In certain aspects, the user device may be configured to present at least a portion of the identified payment instruments to the user prior through a corresponding interface.

In certain example, exemplary objects and advantages of the disclosed embodiments may be set forth in part in the description that follows, and in part will be obvious from the description, or may be learned by practice of the disclosed embodiments. It is to be understood that both the foregoing general description and the following detailed description are exemplary and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

FIG. 6 illustrates exemplary correlation information, consistent with disclosed embodiments.

DESCRIPTION OF THE EMBODIMENTS

Reference will now be made in detail to embodiments of the present disclosure, examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise.

Figure 1:
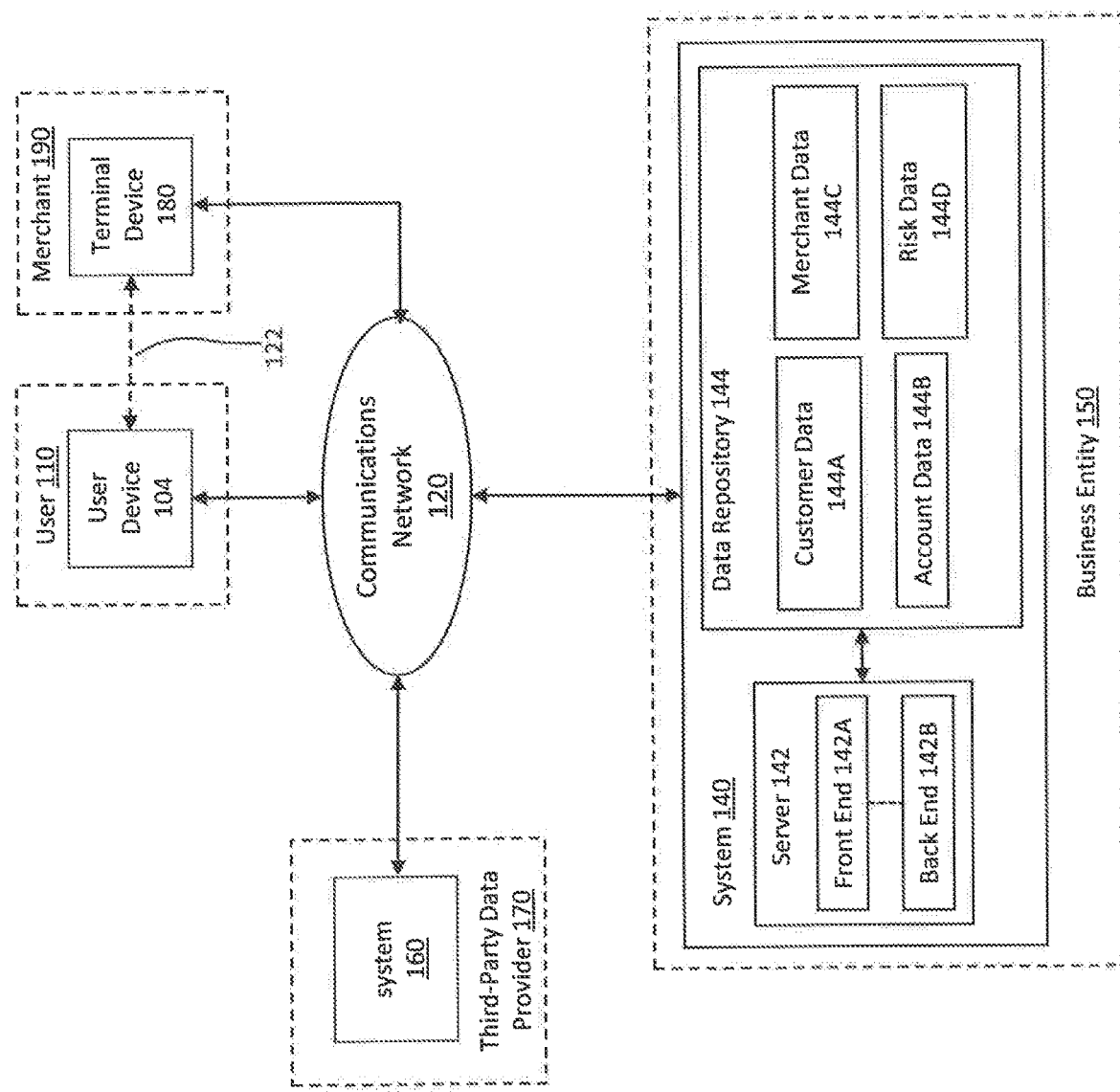
FIG. 1 is a diagram of an exemplary computing environment consistent with disclosed embodiments.

FIG. 1 illustrates an exemplary computing environment 100 consistent with certain disclosed embodiments. In one aspect, computing environment 100 may include a client device 104, systems 140 and 160, terminal device 180, and a communications network 120 connecting one or more of the components of environment 100.

In one embodiment, system 140 may be one or more computer systems configured to process and store information, and execute software instructions to perform one or more processes consistent with the disclosed embodiments. In certain exemplary embodiments, although not required, system 140 may be associated with a business entity 150. In certain embodiments, business entity 150 may be any type of business entity, such as a financial institution, a travel services business, a hotel or lodging business, or any other type of business entity. For example, system 140 may be a system associated with a commercial bank, an investment bank, a provider of a payment instrument or financial service accounts, etc. In some embodiments, a financial service account may be a check, savings, credit, debit, prepay account, and/or a reward or loyalty account. In some aspects, a payment instrument may include, but is not limited to, a personal or corporate credit card, a debit card, a prepaid credit or debit card, or a check instrument.

While certain aspects of the disclosed embodiments are described in connection with business entity 150 as a financial institution that provides financial service accounts to user 110 (and other users) and processes financial transactions associated with those financial service accounts, the disclosed embodiments are not so limited. In other embodiments, system 140 may be associated with a business entity 150 that provides accounts for users for other types of transactions, such as hotel guest accounts, passport or travel identification accounts, location access identification accounts (e.g., employment and government identification accounts), educational institution related accounts (e.g., student identification, meal cards, etc.), and the like.

In certain embodiments, system 140 may include one or more servers 142 and one or more data storages, such as data repository 144. Server 142 may be, for example, a computing system that processes one or more transactions involving user 110. A transaction may include financial transactions (e.g., purchase transactions, banking transactions, etc.), or other forms of transactions (e.g., access to a location, check out transactions of material, products, goods, etc., such as library transactions, etc.).

In one embodiment, server 142 may include a front end 142A, and a back end 142B in communication with front end 142A, although the configuration of server 142 is not limited to such configurations. In one example, front end 142A and back end 142B of server 142 may be incorporated into a single computer, a single server, or any additional or alternate computing device apparent to one or skill in the art. In other embodiments, front end 142A and backend 142B may be distributed computing devices. Further, in one embodiment, front end 142A may be one or more software programs, such as a software application (e.g., a web service) executed by one or more processors included in server 142. Similarly, backend 142B may be one or more software programs executed by one or more processors included in server 142. Server 142 is not limited to such configurations. In additional embodiments, front end 142A software can be executed by a server or computing system separate from a server or computing system that executes back end 142B.

Server 142 may be configured to execute software instructions to perform one or more processes consistent with the disclosed embodiments. In one embodiment, client device 104 may exchange information and parameters facilitating execution of one or more transactions associated with system 140. In one embodiment, where business entity 150 is a financial institution that provides financial service accounts and system 140 is configured to perform financial service account transaction processes, transactions may include, but are not limited to, a purchase or sale of goods or services, a transfer of funds between financial accounts (e.g., checking, savings, investment, etc.), a payment of a bill, a purchase or sale of a financial instrument or security, a deposit or withdrawal of funds, or an application for credit. Server 142 may be implemented with one or more processors or computer-based systems, such as for example, a computer-system 200 of FIG. 2).

Data repository 144 may be one or more data storages configured td store information consistent with the disclosed embodiments. In one aspect, data repository 144 may include customer data 144A, account data 144B, merchant data 144C, and risk data 144D. Data repository 144 may be a component of system 140 or may be wholly or partially implemented by one or more external data providers (e.g., data provider 170 associated with system 160). Further, the disclosed embodiments may be configured to update or supplement information stored in data repository 144 by data available through an external data provider (e.g., data provider 170, as described below). By way of example, data provider 170 may include, but is not limited to, a credit bureau, a law enforcement agency, a governmental entity, a social media entity an entity associated with a social media system that enables users to provide customized ratings of merchants), a cloud storage provider, and any additional or alternate entity.

In some aspects, customer data 144A may include one or more data records uniquely identifying one or more users 110 of business entity 150 associated with system 140. By way of example, a customer of a financial institution (e.g., business entity 150) may access a web page associated with system 140 (e.g., through a web server executed by front end 142A), and subsequently register for online banking services and provide data. The data may be linked to the customer and stored within customer data 144A.

In certain aspects, customer data 144A may include personal information associated with user 110 (e.g., a name, home address, or date of birth), demographic information (e.g., educational level, income level), government-issued identifiers (e.g., driver's license numbers or Social Security numbers), employment information (e.g., employer name or address), and/or contact information (e.g., e-mail addresses, home numbers, work numbers, or mobile numbers). Other types of customer information may be stored and used by the disclosed embodiments.

Customer data 144A may also include client device identification information identifying one or more client devices 104 registered to user 110. In one embodiment, user 110 may provide the client device identification information (e.g., a mobile telephone number provided by the user when registering for online banking services). Alternatively, server 142 may be configured to execute processes that automatically collect client device identification information (e.g., collecting an Internet Protocol (IP) address associated with the customer's smartphone).

In certain aspects, account data 144B may include account identification information identifying one or more accounts held by customers at a financial institution (e.g., business entity 150) associated with system 140. In one embodiment, account identification information may include financial service account information. For example, such financial service account information may include a checking account, a savings account, a revolving credit line, an account linked to a credit or debit card, a pre-paid gift card, a pre-paid debit card, a brokerage account, and any additional or alternate account provided or supported by the issuing bank. Further, in some aspects, the financial service account information may identify accounts linked to one or more physical credit, debit, pre-paid gift, and/or pre-paid debit cards, which may be issued to user 110 by an issuing entity. In other aspects, the financial service account information may identify accounts linked to one or more virtual credit, debit, pre-paid gift, and/or pre-paid debit cards, which may be loaded into a mobile wallet established on and maintained by user device 104. Information within account data 144B may also identify, for a single customer, one or more accounts associated with the customer, account data corresponding to the accounts (e.g., account, expiration date information, card security codes, account balance information, and/or credit limit information), and additionally or alternatively, one or more benefits or amenities associated with the accounts (e.g., a credit card account associated with enhanced fraud protection).

In other aspects, account data 144B may include account information associated with nonfinancial service accounts, such as membership accounts for certain services or activities (e.g., gym membership, prescription drug information, library card, employment identification, student account information, etc.). Further, account 144B may also include information that establishing a participation of user 110 in one or more business-related programs provided by business entity 150 (e.g., a merchant fraud risk alert program that provides user 110 with automated or semi-automated alerts of potential merchant fraud).

Merchant data 144C may include information that identifies one or more merchants associated with business entity 150 and/or system 140. In one embodiments, the identified merchants may include a physical merchant, an electronic merchant, and/or a merchant having both a physical and an electronic presence (e.g., a brick-and-mortar store that also conducts electronic commerce through a website). By way of example, merchants consistent with the disclosed embodiments may include, but are not limited to, merchants that participate in various purchase-type transactions merchants that participate in point-of-sale (POS) transactions facilitated by system 140, and merchants having a business or contractual relationship with business entity 150.

In certain aspects, a merchant may provide elements of the identifying information to server 142 (e.g., in furtherance of an existing relationship or as a condition to complete corresponding purchase-type transaction). In other aspects, server 142 may be configured to execute processes that automatically collect elements of the identifying information (e.g., by collecting an Internet Protocol (IP) address associated with a merchant's computer system). Server 142 may assign a unique alpha-numeric identifier to the merchant, link the identifying information to the merchant through the assigned identifier, and store the identifier and the linked identifying information in a corresponding data record within merchant data 144C.

In an embodiment, for a corresponding merchant, merchant data 144C may include a name of the merchant, a merchant type (e.g., electronic or physical), and information identifying goods and services offered for sale by the merchant. Additionally, for a physical merchant, merchant data 144C may include a street address or other geographic data that identifies a location of the physical merchant within a geographic region (e.g., GPS data, a geo-reference identifier, or corresponding latitude, longitude, and altitude). In other aspects, merchant data 144C may include a URL address or an IP address associated with a corresponding electronic merchant. Further, in other aspects, merchant data 144C may include additional or alternate types of merchant data.

Risk data 144D may include information that identifies prior instances of fraudulent activity involving one or more merchants (e.g., merchants identified in merchant data 144C). In one embodiment, system 140 may be configured to provide consolidated visualization (e.g., an online financial service portal) that, upon presentation to a customer at user device 104, enables the customer to report instances of fraudulent activity (e.g., card skimming, card data theft, or unauthorized use of a payment instrument, such as a credit or debit card). For example, to report an instance of fraudulent activity, the customer may provide system 140 with information identifying the merchant (e.g., a name and/or a portion of an address), a date and approximate time of the fraudulent activity, and any additional or alternate information that facilitates an identification of the fraudulent activity by system 140. In certain aspects, system 140 may identify the merchant associated with the reported fraudulent activity and a corresponding merchant identifier, link the received report to the merchant identifier, and store the merchant identifier and information associated with the report as a data record in risk data 144D.

Additionally or alternatively, system 140 may be configured to automatically identify instances of fraudulent activity involving a merchant. By way of example, system 140 may detect instances of chargeback activity associated with the merchant and involving fraudulent activity. In some aspects, system 140 may link the information associated with detected chargeback to the merchant identifier, and store the merchant identifier and the detected chargeback information associated as a data record in risk data 144D.

Merchant risk data 144D may also include information identifying one or more external data providers (e.g., data provider 170 associated with system 160) capable of providing information indicative of a risk of fraudulent activities involving one or more merchants, By way of example, data provider 170 may include, but is not limited to, a credit bureau, a law enforcement agency, a governmental entity, a social media entity (e.g., an entity that enables customers to provide customized ratings for merchants), and any additional or alternate electronic entity capable of providing information indicative of potential fraud involving an electronic or physical merchant. In certain aspects, system 140 may access system 160 (e.g., through a corresponding application programming interface (API)) to obtain fraud risk information associated with a particular electronic or physical merchant, and additionally or alternatively, one or more merchants disposed within a geographic region that includes the particular merchant.

Merchant risk data 144D may also include information establishing an indexed table or list of fraud risk scores for one or more merchants (e.g., electronic and/or physical merchants identified in merchant data 144C). In an embodiment, a fraud risk score for a corresponding merchant may be indicative of an existence and/or a pervasiveness of prior fraudulent activity involving the corresponding merchant. For example, fraud risk scores consistent with the disclosed embodiments may be based on historical fraud risk data stored in a corresponding data repository of system 140 (e.g., risk data 144D of data repository 144), fraud risk data obtained from one or more external data providers (e.g., data provider system 160) accessible to server 142 across communications network 120, and/or prior reported fraudulent activities involving merchants disposed within corresponding geographic regions.

Further, in one aspect, a fraud risk score for a corresponding merchant may objectively reflect the existence and pervasiveness of prior fraudulent activity involving the corresponding merchant. For example, server 142 may identify a number of prior reported instances of fraudulent activity (e.g., reports of card skimming or unauthorized use) involving the corresponding merchant. Server 142 may assign a pre-determined point value to each of the prior reported instances, and may aggregate the assigned point values to generate the fraud risk score for the corresponding merchant.

In additional aspects, the objective fraud risk score for the corresponding merchant may be adjusted in accordance with one or more subjective factors to yield a subjective fraud risk score. For example, system 140 may be configured to execute software instructions that adjust the objective fraud risk score to more heavily weigh recently reported instances of fraudulent activity involving the corresponding merchant. In other aspects, system 140 may be configured to execute software instructions that adjust the objective fraud risk score to account for changes in a number of reported instances over time. For example, system 140 may decrease or increase the objective fraud risk score of the corresponding merchant in response to an increase or decrease in the number of reported instances of fraudulent activity during one or more prior temporal periods (e.g., during prior days, weeks, or months, or alternatively, during days, weeks, or months in prior years). Further, in some instances, server 142 may adjust the objective fraud risk score to account for the corresponding merchant's level of cooperation with police and judicial entities, and additionally or alternatively, based on remedial actions taken by the corresponding merchant to avoid future fraudulent activity (e.g., a termination of an employee that caused the prior fraudulent activity). The disclosed embodiments are not limited to these exemplary subjective factors, and in further embodiments, server 142 may adjust an objective fraud risk score based on any additional or alternate factor appropriate to the a corresponding merchant, user 110, and server 142.

The fraud risk score table established in risk data 144D may link information identifying the merchants (e.g., merchant names and/or alphanumeric identifiers) to corresponding ones of the risk fraud scores, which may be indexed and ranked in order of ascending or descending magnitude (e.g., in order of increasing or decreasing amounts of reported prior fraudulent activity). In certain aspects, the tabulated fraud risk scores may represent raw scores, or alternatively, the tabulated scores may be normalized to range from zero to unity, from zero to one hundred, or in accordance with any additional or alternate normalization scheme appropriate to the merchant fraud scores.

In some embodiments, a position of a merchant within the indexed fraud risk score table may be indicative of a level of risk of future fraudulent activity involving that merchant. For example, the disclosed embodiments may be configured to establish the merchant's position within the indexed fraud risk score table based on the corresponding objective fraud risk score, which may be adjusted to account for temporal variations in reported instances of fraudulent activity (e.g., increases or decreases in reported fraudulent activity), the merchant's level of cooperation with police and judicial entities, and/or remedial actions taken by the corresponding merchant to avoid future fraudulent activity (e.g., a termination of an employee that caused the prior fraudulent activity).

In certain aspects, the indexed fraud risk score table may include a threshold risk value that separates merchants associated with a low risk of future fraudulent activity (e.g., merchants having fraud risk scores that fail to exceed the threshold risk value) from those merchants associated with an elevated risk of future fraudulent activity (e.g., merchants having fraud risk scores that exceed the threshold risk value). Further, in certain aspects, the indexed fraud risk score table may also apportion those merchants having fraud risk scores than larger than the threshold risk value to corresponding levels of increasing risk for future fraudulent transactions (e.g., "medium risk," "high risk," and "extremely high risk"). For example, the relationship between fraud risk score and risk level may be linear, exponential, logarithmic, or any additional or alternate relationship appropriate to the merchants, user 110, and system 140.

In further aspects, risk data 144D may also store information identifying multiple indexed fraud risk score tables associated with particular groups of merchants (e.g., subsets of merchants identified within merchant data 144C). For example, such groups of merchants may include, but are not limited to, groups of merchants located within corresponding geographic regions, specific types of merchants (e.g., physical or electronic merchants), and merchants offering specific types of goods or services for sale.

Merchant risk data 144D may also store information identifying correlations between one or more of the levels of risk and corresponding payment instruments. For example, the correlation information may identify one or more payment instruments (e.g., cash, credit card, and/or debit cards) that business entity 150 deems appropriate to the risk levels.

System 160 may be one or more servers or computer systems configured to process and store information, and execute software instructions to perform one or more processes consistent with the disclosed embodiments. In certain exemplary embodiments, although not required, system 160 may be associated with a third-party data provider 170. By way of example, third-party data provider 170 may include, but is not limited to, a credit bureau, a law enforcement agency, a governmental entity, a social media entity (e.g., an entity that provides social media sites), and any additional or alternate entity capable of obtaining, storing, and/or reporting information on experiential and credit card fraud including merchants disposed within geographic regions. In certain aspects, data provider system 160 may include one or more processors or computer-based systems (e.g., computer-system 200 of FIG. 2), and may be configured to receive and service requests for merchant fraud data from one or more components of environment 100 (e.g., client device 104 and/or system 140).

Client device 104 may be one or more client devices. In certain embodiments, client device 104 may be associated with one or more users 110. In one example, user 110 may use client device 104 to perform one or more processes consistent with the disclosed embodiments. For example, user 110 may use client device 104 to perform a transaction involving an account associated with the user and provided, maintained, managed, and/or processed by system 140. In certain aspects, client device 104 can include, but is not limited to, a personal computer, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), a smart phone, and any additional or alternate computing device, and may be operable to transmit and receive data across network 120. Client device 104 may be implemented with one or more processors or computer-based systems, such as for example, computer-system 200 of FIG. 2.

In certain aspects, terminal device 180 may be associated with merchant 190, and may facilitate purchases of goods and/or services by user 110 from merchant 190 using one or more of the financial service accounts held by user 110 (e.g., a credit card, debit card, pre-paid gift or debit card, etc.). By way of example, user 110 may initiate a purchase at merchant 190 by providing information associated with one of the financial services accounts to terminal device 180 (e.g., through a magnetic card reader, etc.). In other aspects, user device 104 may be configured to execute an application program (e.g., a mobile-wallet application) that establishes a mobile wallet on user device 104 and that loads one or more eligible financial products into the established mobile wallet (e.g., one or more of the eligible virtual credit, debit, pre-paid gift, and/or pre-paid debit cards stored in account data 144B). The executed mobile-wallet application may initiate communications and exchange authentication data with terminal device 180 (e.g., to establish a "handshake" between user device 104 and terminal device 180) using communications link 122 (e.g., a near-field communications (NFC) connection, a Bluetooth™ connection, etc.). Further, after completion of the handshake, the executed mobile-wallet application may enable user 110 to provide input that initiates the purchase with merchant 190 using one or more of the loaded and eligible financial products.

In certain aspects, terminal device 180 may include a wired or wireless point-of-sale (POS) terminal in communication with system 140 (e.g., connected to network 120) to execute initiated purchase transactions using obtained account data. In other aspects, however, terminal device 180 may include, but is not limited to, a personal computer, a laptop computer, a tablet computer, a notebook computer, a hand-held computer, a personal digital assistant, a portable navigation device, a mobile phone, a smart phone, and any additional or alternate computing device, and may be operable to transmit and receive data across network 120. Terminal device 180 may be implemented with one or more processors or computer-based systems, such as for example, computer-system 200 of FIG. 2.

Further, although computing environment 100 is illustrated in FIG. 1 with one client device 104, the disclosed embodiments may include a plurality of client devices 104, each associated with one or more users 110 (e.g., a first client device operated by a first user and a second client device operated by a second user). Similarly, although computing environment 100 is illustrated in FIG. 1 with a single system 140, a single system 160, a single terminal device 180, and a single user 110, persons of ordinary skill in the art will recognize that environment 100 may include any number of additional numbers of systems 140, systems 160, terminal devices 180, and/or users 110.

Communications network 120 may include one or more communication networks or medium of digital data communication. Examples of communication network 120 include a local area network ("LAN"), a wireless LAN, a RF network, a Near-Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

Figure 2:
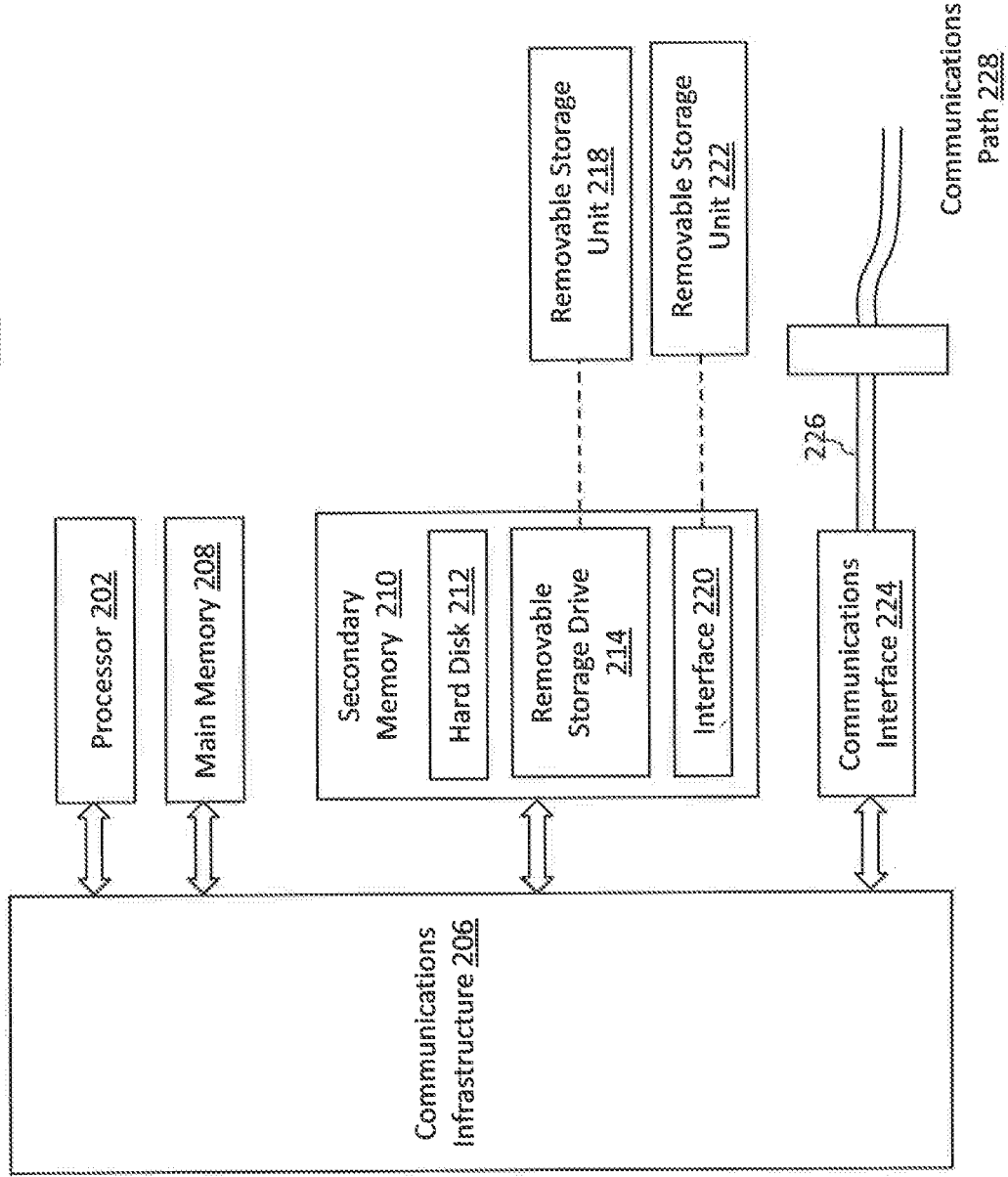
FIG. 2 is a diagram of an exemplary computer system, consistent with disclosed embodiments.

FIG. 2 illustrates an exemplary computer system 200 with which embodiments consistent with the present disclosure may be implemented. In certain embodiments, computer system 200 may reflect computer systems associated with server 142 or client device 104. In certain embodiments, computer system 200 may include one or more processors 202. Processor 202 may be connected to a communication infrastructure 206, such as a bus or communications network, e.g., a communications network 120 depicted in FIG. 1.

Computer system 200 may also include a main memory 208, for example, random access memory (RAM), and may include a secondary memory 210. Memory 208 may represent a tangible and non-transitory computer-readable medium having stored therein computer programs, sets of instructions, code, or data to be executed by processor 202. Secondary memory 210 may include, for example, a hard disk drive 212, and/or a removable storage drive 214, representing a magnetic tape drive, flash memory, an optical disk drive, CD/DVD drive, etc. The removable storage drive 214 may read from and/or write to a removable storage unit 218 in a well-known manner. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, etc. Communications interface 224 may transfer software and data in the form of signals 226, which may be electronic, electromagnetic, optical or other signals capable of being received by communications interface 224. These signals 226 may be provided to communications interface 224 via a communications path (i.e., channel 228). Channel 228 carries signals 226 and may be implemented using wire, cable, fiber optics, RF link, and/or other communications channels. In a disclosed embodiment, signals 226 comprise data packets sent to processor 202. Information representing processed packets can also be sent in the form of signals 226 from processor 202 through communications path 228.

In certain embodiments in connection with FIG. 2, the terms "storage device" and "storage medium" may refer to particular devices including, but not limited to, main memory 208, secondary memory 210, a hard disk installed in hard disk drive 212, and removable storage units 218 and 222. Further, the term "computer-readable medium" may refer to devices including, but not limited to, a hard disk installed in hard disk drive 212, any combination of main memory 208 and secondary memory 210, and removable storage units 218 and 222, which may respectively provide computer programs and/or sets of instructions to processor 202 of computer system 200. Such computer programs and sets of instructions can be stored within one or more computer-readable media. Additionally or alternatively, computer programs and sets of instructions may also be received via communications interface 224 and stored on the one or more computer-readable media.

Such computer programs and instructions, when executed by processor 202, enable processor 202 to perform one or more processes consistent with the disclosed embodiments. Examples of program instructions include, for example, machine code, such as code produced by a compiler, and files containing a high-level code that can be executed by processor 202 using an interpreter.

Furthermore, the computer-implemented methods described herein may be implemented by a single processor of a computer system, such as processor 202 of system 200. In additional embodiments, however, these computer-implemented methods may be implemented using one or more processors within a single computer system, and additionally or alternatively, these computer-implemented methods may be implemented on one or more processors within separate computer systems linked via a network.

The disclosed embodiments include systems and methods that may be configured to notify a customer of a risk of fraudulent activity associated with a merchant before the customer initiates a financial transaction (e.g., a purchase of goods and/or services) involving the merchant. In some aspects, the merchant may be a "physical" merchant having one or more merchant locations disposed within a geographic region, an "electronic" merchant that conducts electronic commerce using a corresponding uniform resource locator (URL) address or Internet Protocol (IP) address, or a combination of an electronic and a physical merchant.

Fraudulent activity consistent with the disclosed embodiments may include, but is not limited to, card skimming activities, an unauthorized use of a customer's payment instrument, over charging for purchased goods or services (e.g., as identified by a third-party social media entity that enables users to provide customized ratings for merchants), other types of card data theft, or and any additional or alternate fraudulent activity perpetrated against a customer by an employee or agent of a merchant. In certain aspects, the disclosed embodiments may be configured to determine the risk of fraudulent activity involving a particular merchant based on prior reported instances of fraudulent activity involving the merchant. The disclosed embodiments may also be configured to determine the particular merchant's risk of fraudulent activity based on one or more subjective factors, including, but not limited to, temporal variations in reported fraudulent activity (e.g., time-varying increases or decreases in reported instances of fraudulent activity), the particular merchant's level of cooperation with police and judicial entities, and remedial actions taken by the merchant to prevent future fraudulent activity. In some aspects, the disclosed systems and method may be configured to provide the customer with information regarding the risks of fraudulent activity in the form of a textual notification, a visual notification, an audible notification, a tactile notification, and any combination thereof.

In an embodiment, a user device (e.g., user device 104) may execute software instructions to notify a customer (e.g., user 110) of a risk of fraudulent activity involving one or more merchants disposed proximate to a current geographic location of user device 104, and additionally or alternatively, disposed within a geographic region that includes the current geographic location (e.g., a neighborhood, etc.). For example, user device 104 may include an embedded positioning system (e.g., a GPS unit) from which user device 104 may obtain GPS data indicative of a current geographic location of user device 104. In some aspects, user device 104 may transmit the obtained GPS data to system 140 at periodic intervals (e.g., at five-minute intervals, fifteen-minute intervals, thirty-minute intervals, etc.) as a request for information identifying risks of fraudulent activity associated with one or more merchants disposed proximate to the current geographic location (e.g., within a threshold distance of the current geographic location), and additionally or alternatively, disposed within a geographic region that includes the current geographic location. In certain aspects, user device 104 may be configured to monitor and/or capture the current geographic location of user device 104, and to automatically request information identifying risks of fraudulent activity, without input or intervention from user 110. For example, user device 104 may be configured to passively monitor and/or capture the current geographic location of user device 104 without input of intervention from user 110.

By way of example, user device 104 may be configured to execute a configurable mobile "app" (e.g., a merchant fraud risk alert program associated with business entity 150), which system 140 may provide to user device 104 (e.g., through a corresponding "app" store or repository). In certain aspects, user 110 may access, through client device 104, a graphical user interface (GUI) associated with the mobile app, and may configure the mobile app to establish one or more of the periodic intervals and the threshold distance. Alternatively, one or more of the periodic intervals or the threshold distance may be established by the mobile app and/or user device 104, and may not be configurable by user 110.

The disclosed embodiments are, however, not limited to periodic requests for information identifying risks of fraudulent activity. In additional aspects, user device 104 may be configured to execute software instructions that automatically request information from system 140 when the current geographic location of user device 104 falls within a particular geographic region. For example, user 110 may access, through client device 104, a graphical user interface (GUI) associated with the mobile app, and may configure the mobile app to establish a particular geographic region of interest to user 110 (e.g., neighborhood in which user 110 frequently shops). In some embodiments, when user device 104 determines that the current geographic location falls within the particular geographic region, user device 104 may automatically transmit the obtained GPS data (and additionally or alternatively, geographic information identifying the particular geographic region) to system 140 as a request for information identifying risks of fraudulent activity involving merchants disposed within the particular geographic region.

User device 104 may also be configured to execute a mapping application that identifies, based on the obtained GPS data, one or more merchants disposed proximate to the current geographic location (e.g., that fall within a threshold distance of the current geographic location). For example, user device 104 may transmit the information identifying the one or more merchants, and additionally or alternatively, the obtained GPS data, to system 140 as a request for information identifying risks of fraudulent activity associated with the one or more identified merchants.

In further embodiments, and in addition to passively captured GPS data, user device 104 may also be configured provide one or more digital images to system 140 as part of the request for information identifying risks of fraudulent activity. For instance, user device 104 may represent a smart phone, tablet, or other computing device having an integrated digital camera that enables user 110 to capture various digital images, which may include images of one or more merchants, and which user device 104 may store within a corresponding library or repository (e.g., data repository 144). In certain aspects, user device 104 may automatically transmit image data corresponding to a newly captured image, along with GPS data obtained using the techniques described above, to system 140 as a request to obtain information identifying risks of fraudulent activity involving one or more one or more merchants.

Further, as described above, user device 104 may store one or more captured digital images within a corresponding library or repository (e.g., data repository 144). The captured digital images may, in some instances, also include temporal information identifying a time or date of capture, and further, geographic information identifying a geographic location (e.g., GPS data) at which user device 104 captured the digital images. In certain embodiments, user device 104 may process the captured image data to identify one or more of the captured digital images having corresponding locations disposed proximate to the current geographic location of user device 104 (e.g., established by the obtained GPS data, as described above). User device 104 may, in some aspects, automatically transmit image data corresponding to the identified digital images, along with GPS data obtained using the techniques described above, to system 140 as a request to obtain information identifying risks of fraudulent activity involving one or more one or more merchants.

In some embodiments, user device 104 may be configured to analyze the newly captured images (and additionally or alternatively, one or more of the stored digital images captured at locations proximate to the current geographic location of user device 104), using one or more image processing techniques and/or optical character recognition (OCR) techniques to obtain information identifying the one or more merchants. For example, user device 104 may perform the OCR techniques to identify and extract machine-readable text from merchant signage present within the captured image data. Further, user device 104 may execute image-processing techniques that identify one or more of the merchants based on corresponding logos or images of storefronts disposed within the captured image data.

In some aspects, user device 104 may automatically transmit the information derived from the captured image data to system 140 as a request to obtain information identifying risks of fraudulent activity associated with the one or more identified merchants. Further, user device 104 may combine or augment the derived information with geographic information (e.g., GPS data) indicating the current geographic location of user device 104, and transmit the augmented information to system 140 using any of the communications protocols outlined above.

In the embodiments described above, user device 104 may be configured to monitor (e.g., passively) and/or capture a current geographic location of user device 104, and to automatically request information identifying risks of fraudulent activity one or more physical merchants, without input or intervention from user 110. The disclosed embodiments are, however, not limited to physical merchants, and in further embodiments, user device may be configured to passively monitor online activities of user 110, and automatically request information identifying risks of fraudulent activity one or more electronic merchants without input or intervention from user 110.

In certain aspects, user 110 may access a web browser or other executable application (e.g., a downloadable mobile "app') executed by user device 104 and associated with a particular electronic merchant. By way of example, user 110 may enter a URL or IP address associated with the electronic merchant into a web browser executed by user device 104 to access a web page that offers the good or service for sale. In some aspects, user device 104 may be configured to execute software instructions (e.g., a plug-in application that interacts with the executable web browser) to monitor (e.g., passively) the online activities of user 110, capture the entered URL or IP address, and transmit information identifying the entered URL or IP address to system 140 as a request for information identifying risks of fraudulent activity involving the particular electronic merchant. By way of example, user device 104 may transmit the request to system 140 automatically and without intervention or input from user 110.

The disclosed embodiments are, however, not limited to techniques that passively capture data indicative of a current geographic location of user device 104 and/or online activities of user 110, and that automatically transmit the captured data to system 140. In additional embodiments, user 110 may, though user device 104, access a web page associated with business entity 150, or alternatively, may execute an application (e.g., a mobile "app") provided by business entity 150, to request and subsequently obtain information identifying risks of fraudulent activity associated with one or more merchants. By way of example, user 110 may consider initiating a transaction to purchase goods and/or services from a particular merchant disposed within a geographic region. Prior to initiating the transaction, user 110 may access the web page or execute the application to enter, generate, or otherwise obtain information identifying the particular merchant, to request that user device 104 capture positional information indicative of the current geographical location of user device 104, and additionally or alternatively, to request that user device 104 capture a URL or IP address entered into an executed web browser. In certain aspects, user device 104 may transmit the merchant information to a system 140 as a request to obtain information identifying risks of fraudulent activities involving the particular physical or electronic merchant.

Consistent with certain embodiments, system 140 may receive the request transmitted by user device 104. As described below in reference to FIG. 3, system 140 may be configured to execute software instructions to identify one or more merchants associated with the received request and further, to determine fraud risk scores indicative of an existence of prior fraudulent activities involving the identified merchants. In certain aspects, and based on a comparison of the determined fraud risk scores with an indexed table of fraud risk scores (e.g., as stored within merchant risk data 144D), system 140 may assign levels of risk to the identified merchants, which may be provided to user device 104 for presentation to user 110, The assigned levels of risk may, in certain embodiments, indicate to user 110 a risk of potential fraudulent activity arising from financial transactions that involve the identified merchant or merchants. User device 104 may present information identifying the assigned risk levels to user 110 (e.g., as a textual notification, a visual notification, an audible notification, a tactile notification, or any combination thereof) prior to an initiation of a financial transaction with the identified merchant or merchants.

Figure 3:
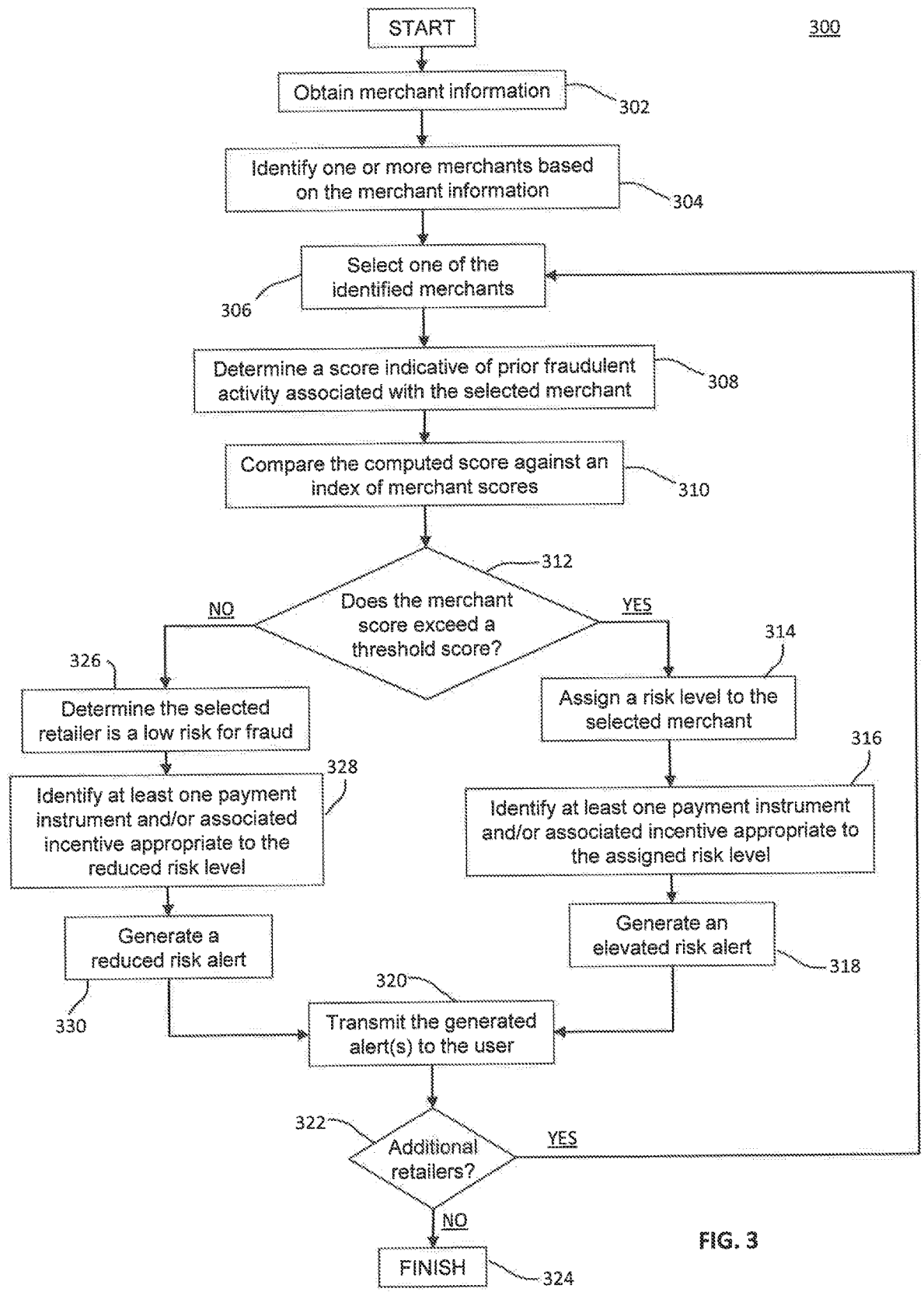
FIG. 3 is a flowchart of an exemplary method for identifying and notifying a customer of risks of fraudulent activity, consistent with disclosed embodiments.

FIG. 3 illustrates an exemplary process 300 for identifying and notifying a customer of risks of fraudulent activity, consistent with disclosed embodiments. In one embodiment, process 300 may be performed by system 140. System 140 may be configured to obtain information identifying one or more physical and/or electronic merchants, and to determine scores indicative of an existence of prior fraudulent activities involving the identified merchant or merchants. Based on a comparison of the determined scores and an indexed table of fraud risk scores, system 140 may be configured to assign a level of risk to the identified merchant or merchants, System 140 may provide the assigned risk levels to a user device (e.g., user device 104) for presentation to a customer (e.g., user 110) before the customer initiates a financial transaction involving the identified merchant or merchants.

In certain aspects, user device 104 may be configured to execute software instructions that monitor (e.g., passively) and identify a current geographic location of user device (e.g., using GPS data obtained from an embedded GPS unit), and additionally or alternatively. Additionally or alternatively, user device 104 may also be configured to executed software instructions that passively monitor and collect information characterizing one or more online activities of user 110 (e.g., information identifying a URL or IP address entered into a web browser executed by user device 104). In some embodiments, user device 104 may transmit the positional information and/or online activity information to system 140 as a request for information identifying risks of fraudulent activity involving one or more physical and electronic merchants. For example, as described above, user device 104 may transmit the request to system 140 automatically, at regular or periodic intervals, and without intervention or input from user 110.

In step 302, system 140 may receive the request for information identifying risks of fraudulent activity involving one or more merchants. In certain aspects, the received request may include geographic information that, among other things, identifies a current geographic location of user device 104. In other aspects, the received geographic information may identify a particular geographic region, e.g., a geographic region of particular interest to user 110, as described above. By way of example, the received geographic information may include, but is not limited to, a portion of a street address, data from a positioning system (e.g., GPS data), one or more geographic coordinates (e.g., latitude, longitude, and altitude), and any additional or alternative geographic information capable of specifying a geographic location or geographic region.

In additional aspects, the received request may include information identifying the one or more merchants. By way of example, the obtained information may include portions of names associated with the one or more merchants (e.g., as entered by user 110 into an interface of user device 104, or alternatively, as extracted by user device 104 from corresponding text or image data). In other aspects, the received merchant information may include image data (e.g., captured by user device 104) that includes the one or more merchants.

Further, in some aspects, the received information may identify a location of electronic resources associated with an electronic merchant. For example, such information may include, but is not limited to, a URL and an IP address with an electronic merchant that conducts electronic commerce.

The disclosed embodiments are, however, not limited to such exemplary information, and in further embodiments, the received request may include any additional or alternate identifying information appropriate to system 140 and user device 104. By way of example, the received information may include raw image data (e.g., captured by user device 104) that includes images of the one or more merchants disposed within a corresponding geographic region (e.g., along a street).

In step 304, system 140 may identify the one or more merchants associated with the received request. In certain aspects, system 140 may access a corresponding data repository (e.g., merchant data 144C of data repository 144) to obtain merchant data associated with candidate merchants. By way of example, and as described herein, the obtained merchant data may specify names, physical and/or electronic locations, and alphanumeric identifiers associated with the candidate merchants. System 140 may, in step 304, compare portions of the received request with the obtained merchant data to identify the one or more merchants associated with the received request.

For example, the received request may identify a geographic location of user 110 and/or user device 104. For example, the received request may include GPS data specifying a current geographic location of user device 104. As described herein, user device 104 may provide the GPS data to system 140 automatically and without input or instructions from user 110 (e.g., at regular intervals, at periodic intervals, or when a position of user device 110 fails within one or more specified geographic regions). In certain aspects, system 140 may analyze the obtained merchant data (e.g., as obtained from merchant data 144C) to determine a set of candidate merchants whose geographic locations fall within a threshold distance of the current location of user device 104. In step 304, system 140 may select a predetermined number of the candidate merchants for association with the received information. For example, the predetermined number of merchants may be established based on a preference of user 110, e.g., established through a corresponding graphical user interface (GUI) provided by user device 104.

In additional embodiments, the received request may include a merchant name (e.g., "Merchant 1") and corresponding geographic information (e.g., Arlington, Va.). In some aspects, system 140 may obtain merchant data stored within merchant data 144C, and may search the merchant data for records associated with Merchant 1. For example, system 140 may initially identify data records corresponding to first location of Merchant 1 in Arlington, Va., and a second location of Merchant 1 located in Bladensburg, Md. In certain aspects, system 140 may leverage the geographic information included within the received information to identify the record within the obtained merchant data corresponding to the location of Merchant 1 in Arlington, Va. System 140 may parse the identified record to obtain an alphanumeric identifier associated with the Merchant 1, and further, a complete street address, merchant type, and information identifying goods and services offered for sale by Merchant 1.

Further, as described above, the received information may also include image data. In an embodiment, in step 304, system 140 may apply one or more image processing techniques and optical character recognition (OCR) techniques to identify the one or more merchants within the image data. For example, system 140 may apply various OCR techniques to identify and retrieve machine-readable text from signs that identify the merchants. Further, in other aspects, system 140 may apply the image processing techniques to identify portions of the image data associated with corresponding merchants, and may access one or more mapping databases to identify the merchants associated with the image data.

Referring back to FIG. 3, system 140 may select one of the identified merchants for further risk analysis in step 306. In step 308, system 140 may determine a fraud risk score indicative of an existence and a pervasiveness of prior fraudulent activity involving the selected merchant. In an embodiment, the determined fraud risk score may reflect a number of prior reported instances of fraudulent activity involving the selected merchant, and further, may reflect the pervasiveness of prior fraudulent activity involving additional merchants disposed within a geographic region of the selected merchant (e.g., within the same neighborhood, along the same street, etc.).

In some aspects, system 140 may access a corresponding data repository (e.g., risk data 144D of data repository 144) and obtain data identifying prior instances of fraudulent activity involving the selected merchant. In an embodiment, and as described herein, system 140 may identify an alphanumeric identifier assigned to the selected merchant, and may access one or more data records associated with the assigned alphanumeric identifier to obtain the historical data.

In other aspects, system 140 may access one or more third-party databases or data providers (e.g., system 160 associated with external data provider 170) to obtain additional or alternative data indicative of prior instances of fraudulent activity involving the selected merchant. By way of example, the external data providers may include, but are not limited to, a credit bureau, a law enforcement agency, a governmental entity, a social media entity (e.g., an entity enabling users to provide customized reviews for one or more merchants), and any additional or alternate electronic entity capable of providing information indicative of prior instances of fraud involving the selected merchant. In some aspects, system 140 may access risk data 144D to obtain information identifying URL addresses and/or IP addresses associated with system 160, and may request the information associated with the selected merchant through a corresponding programmatic interface, such as an API.

In an embodiment, in step 308, system 140 may identify a number of prior reported instances of fraudulent activity involving selected merchant (e.g., based on data reported to or identified by system 140, or data obtained from one or more external data provider systems 160), and may assign a predetermined point value to each of the prior reported instances. System 140 may, in certain instances, aggregate the assigned point values to determine the fraud risk score for the selected merchant. As described above, the determined score may represent an "objective" fraud risk score derived solely from prior reported instances of fraud involving the selected merchant.

In other embodiments, system 140 may determine a fraud risk score for the selected merchant based not on prior reported instances of fraudulent activity involving selected merchant, but on aggregate measure of prior instances of fraudulent activity involving merchants disposed within a geographic region associated with the selected merchant. For example, the selected merchant may be located in a geographic region notorious for fraudulent activities, such as credit card skimming. In some aspects, system 140 may identify a geographic region associated with the selected merchant. As described above, system 140 may obtain information identifying instances of prior fraudulent activity involving merchants disposed within the geographic region from a corresponding data repository (e.g. risk data 1440 of data repository 144) or from one or more external data providers (e.g., external data provider 170) accessible to system 140 across communications network 140.

The disclosed embodiments are not limited to such exemplary techniques for computing objective fraud risk scores, and in further embodiments, server 140 may determine objective fraud risk scores for the selected merchant, or for the geographic region associated with the selected merchant, using any of a number of additional techniques. For example, system 140 may determine the objective fraud risk score for the selected merchant based not only on a total number of prior instances of fraudulent activity, but also on instances of fraudulent activity occurring within a particular period of time. Further, system 140 may define the objective fraud risk score for the selected merchant as a ratio comparing a number of prior instances of fraudulent activity with a total number of financial services transactions processed by system 140 over the particular time period. Further, in some instances, server 140 may determine the objective fraud risk score for the selected merchant based on the number of instances of fraudulent activity involving the selected merchant and total monetary value of the instances of fraudulent activity. Additionally or alternatively, the objective fraud risk score for the selected merchant may represent an summation of multiple fraud risk scores computed based on prior instances of fraudulent activity reported to system 140 (e.g., stored within risk data 144D), obtained from external sources (e.g., system 160), and representative of merchants within a geographic region that includes the selected merchant.

In additional embodiments, system 140 may adjust the objective fraud risk score determined in step 308 in accordance with one or more subjective factors to yield a "subjective" fraud risk score. For example, system 140 may adjust the objective fraud risk score to more heavily weigh recently reported instances of fraudulent activity involving the selected merchant. Further, in some instances, system 140 may adjust the objective score based on the selected merchant's level of cooperation with police and judicial entities, and additionally or alternatively, based on remedial actions taken by the selected merchant to avoid future fraudulent activity.

In other aspects, system 140 may adjust the objective fraud risk score to account for changes in the number of reported instances over time. For example, system 140 may decrease or increase the objective fraud risk score of the corresponding merchant in response to an increase or decrease in the number of reported instances of fraudulent activity during one or more prior temporal periods (e.g., during prior days, weeks, or months, or alternatively, during days, weeks, or months in prior years). The disclosed embodiments are not limited to these exemplary subjective factors, and in further embodiments, system 140 may adjust the objective fraud risk score for the selected merchant based on any additional or alternate factor appropriate to the selected merchant, user 110, and server 142.

In additional embodiments, in step 308, system 140 may access a corresponding data repository (e.g., risk data 144D of data repository 144) and obtain information identifying the fraud risk score for the selected merchant. In such embodiments, score for the selected merchant, and for any number of additional merchants, may be updated using the processes described above on a periodic basis to reflect newly reported instances of fraud, or alternatively, in response to specific reports of fraudulent activity.

Referring back to FIG. 3, system 140 may compare the fraud risk score for the selected merchant against an indexed table of fraud risk scores associated with previously scored merchants (e.g., step 310). As described herein, system 140 may access a corresponding data repository (e.g., risk data 144D of data repository 144) to obtain information establishing the indexed fraud risk score table.

In some aspects, the indexed fraud risk score table may include a list of fraud risk scores linked to corresponding merchants and ordered in accordance with magnitudes of the fraud risk scores (e.g., in order of increasing or decreasing numbers of reported instances of prior fraud). As described herein, the indexed fraud risk score table may include raw risk fraud scores, or alternatively, the indexed fraud risk score table may include normalized scores that range from zero to unity, from zero to one hundred, or in accordance with any additional or alternate normalization scheme appropriate to the merchant fraud scores.

In an embodiment, the obtained indexed fraud risk score table may include a threshold risk value that separates merchants associated with a low risk of future fraudulent activity (e.g., merchants having fraud risk scores that fail to exceed the threshold risk value) from those merchants associated with an elevated risk of future fraudulent activity (e.g., merchants having fraud risk scores that exceed the threshold risk value). Further, in certain aspects, the indexed fraud risk score may also apportion those merchants having fraud risk scores than larger than the threshold risk value to corresponding levels of increasing risk of future fraudulent transactions (e.g., "medium risk," "high risk," and "extremely high risk").

In an embodiment, system 140 may determine the threshold risk value in step 310 based on one or more industry standards, based in a statistical analysis of merchant fraud data, based on one or more business objectives associated with business entity 150 (e.g., to reduce a number of fraudulent transactions below a pre-determined value), or based on a comparison of comparable merchants at a local, state, or national level. Further, in additional embodiments, system 140 may identify multiple threshold values based on an analysis of the tabulated fraud risk scores for various segments or types of merchants. For example, system 140 may establish different threshold risk levels in step 310 for different temporal periods (e.g., threshold risk levels may be lower during holiday periods); for different classes of merchants (e.g., threshold risk levels for electronic merchant may be established lower relative to threshold risk levels for physical merchants); for merchants offering different types of goods and services for sale (e.g., threshold risk levels for merchants of electronic goods may be lower relative to merchants of contraction equipment); for merchants in different geographic areas (e.g., merchants disposed within high-crime areas may be assigned threshold risk levels higher than those in low-crime areas); and/or based on other demographic characteristics of the merchants.

In some embodiments, user 110 may establish a customized threshold risk value more conservative than those assigned by system 140. By way of example, user 110 may be a past victim of identity theft or may regularly purchase goods or services in areas of criminal activity, and may desire an additional layer of protection for his or her own accounts and corresponding payment instruments. In such aspects, user 110 may access a consolidated visualization (e.g., an online financial portal) provided by system 140, and may establish one or more user preferences that define a customized threshold risk level for all transactions, or selected subsets of transaction.

Referring back to FIG. 3, system 140 may access a corresponding data repository (e.g., risk data 144D of data repository 144) and obtain information identifying the entries of the indexed score table (e.g., step 310), Further, in step 310, system 140 may identify the threshold risk value appropriate to the selected merchant, and additionally or alternatively, of one or more geographic, business, or demographic characteristics of the selected merchant. In step 312, system 140 determine whether the fraud risk score for the selected merchant falls below the identified threshold risk value.

Figure 4A:
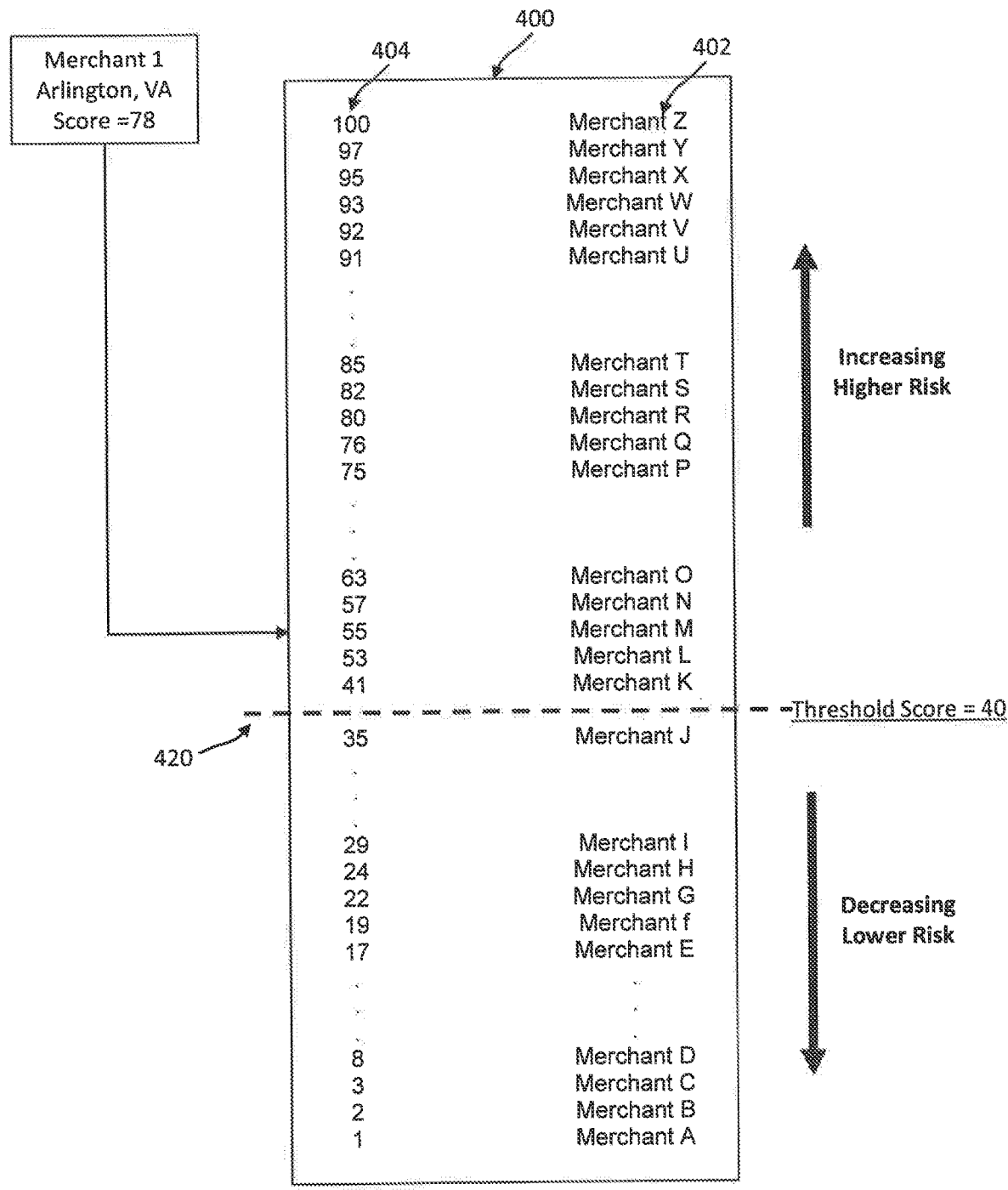
FIGS. 4A-4B are diagrams of exemplary listings of fraud risk scores, consistent with disclosed embodiments.
Figure 4B:
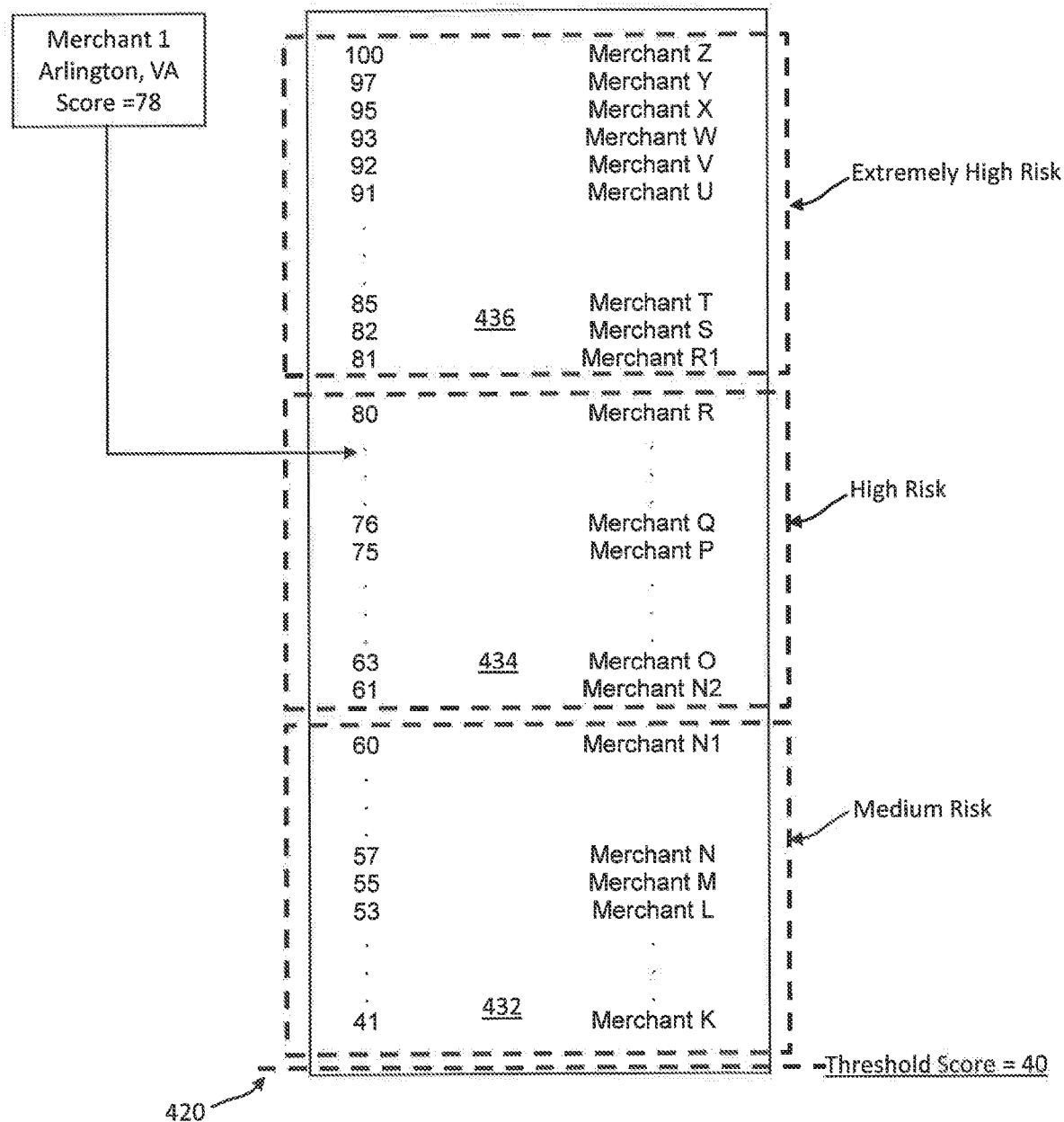

FIGS. 4A and 4B illustrate exemplary representations of an indexed fraud risk score table 400, in accordance with disclosed embodiments. In certain aspects, entries of indexed score table 400 may link merchants 402 to corresponding normalized scores 404. In the exemplary listing of FIG. 4A, normalized scores 404 range in value from one to 100, with a score of unity being indicative of a minimum risk, and a score of 100 being indicative of a maximum risk. Further, system 140 may identify a threshold risk value 420 equivalent to a normalized score of forty, which partitions the entries of indexed fraud risk score table 400 into elevated-risk merchants (e.g., having normalized scores greater than threshold risk value 420) and low-risk merchants (e.g., having normalized scores less that threshold risk value 420).

In certain aspects, the disclosed embodiments may generate and store merchant fraud risk scores as a corresponding data structure in a portion of a data repository (e.g., system 140 may be configured to generate and store table 400 in risk data 144D). Other types of data structures may be implemented, and that the format and configuration of table 400 is exemplary and not limiting to the disclosed embodiments In an embodiment, system 140 may compare a normalized score of a selected merchant against other merchants within indexed fraud risk score table 400 (e.g., step 310 of FIG. 3). For example, as depicted in FIG. 4A, the selected merchant may correspond to Merchant 1 of Arlington, Va., and Merchant 1 may be associated with a normalized score of seventy-eight. Based on the comparison of the normalized score with the indexed fraud risk score table 400, the normalized score of Merchant 1 exceeds threshold risk value 420, and accordingly, Merchant 1 may be associated with an elevated risk of fraudulent activities.

Referring back to FIG. 3, if system 140 determines that the fraud risk score of the selected merchant exceeds the threshold risk value (e.g., step 312; YES), system 140 may assign a risk level to the selected merchant in step 314. As described herein, the risk level assigned to the selected merchant may be indicative or a risk or probability that future transactions involving the selected merchant will be associated with fraudulent activity (e.g., illegal card skimming activities). In some aspects, and as illustrated in FIG. 4B, system 140 may identify entries of indexed score table 400 having normalized scores that exceed threshold risk score 420, and may apportion the merchants to corresponding levels of increasing risk of future fraudulent transactions (e.g., "medium risk," "high risk," and "extremely high risk").

For example, as illustrated in FIG. 4B, system 140 may establish a first segment 432 of entries having normalized scores ranging from forth-one to sixty, a second segment 434 of entries having normalized scores ranging from sixty-one to eighty, and a third segment 436 of entries having normalized scores ranging from eight-one to 100. Further, in FIG. 4B, system 140 may determine that segment 432 includes merchants having a "Medium Risk" of future fraudulent activity, that segment 434 includes merchants having a "High Risk" of future fraudulent activity, and that segment 436 includes merchants having an "Extremely High Risk" of future fraudulent activity. In such aspects, system 140 may determine that Merchant 1 located in Arlington, Va., may be associated with a high level of risk for future fraudulent transactions, as the normalized score of seventy-eight disposes Merchant 1 into second segment 434, as illustrated in FIG. 4B.

In certain aspects, system 140 may apportion the merchants of indexed fraud risk score table 400 to corresponding risk levels based on a statistical analysis of normalized scores 404 (e.g., a determination that scores "clump together" in discrete ranges of normalized score), based on one or more industry standards, based on one or more business objectives associated with business entity 150 (e.g., to reduce a number of fraudulent transactions below a pre-determined value), or based on a comparison on comparable merchants at a local, state, or national level. Furthermore, the disclosed embodiments are not limited to "Medium," "High," and "Extremely High" levels of risk, and in additional embodiments, system 140 may assign any additional or alternate risk level to segments 432, 434, and 436 that appropriate to user 110, merchants 402, and system 140.

Referring back to FIG. 3, in step 316, system 140 may identify one or more payment instruments appropriate to the elevated risk level assigned to the selected merchant, and further, one or more incentives associated with the one or more appropriate payment instruments. In certain instances, system 140 may provide the one or more incentives (e.g., discounts on current or future purchases, coupons, loyalty- and/or rewards-program points, etc.) to user 110 in an effort to induce user 110 to utilize corresponding ones of the appropriate payments instruments for purchases involving the selected merchant. System 140 may, for example, establish fixed incentive types for specific types of payment instruments (e.g., fixed discounts for cash, pre-paid gift cards, etc.) and specific risk levels, and additionally or alternatively, adaptively determine one or more incentives for user 110 based on portions of customer data 144A and/or account data 144B described above.

For example, system 140 may obtain information identifying one or more payment instruments held and available for use in purchases by user 110, and further, correlation information that correlates the available payment instruments and/or the incentives with one or more assigned levels of risk. As described below in reference to FIG. 5, system 140 may compare the available payment against the obtained correlation information to identify one or more of the payment instruments suitable for purchases at the selected merchant and further, one or more incentives available to induce user 110 and associated with the identified payment instruments.

Figure 5:
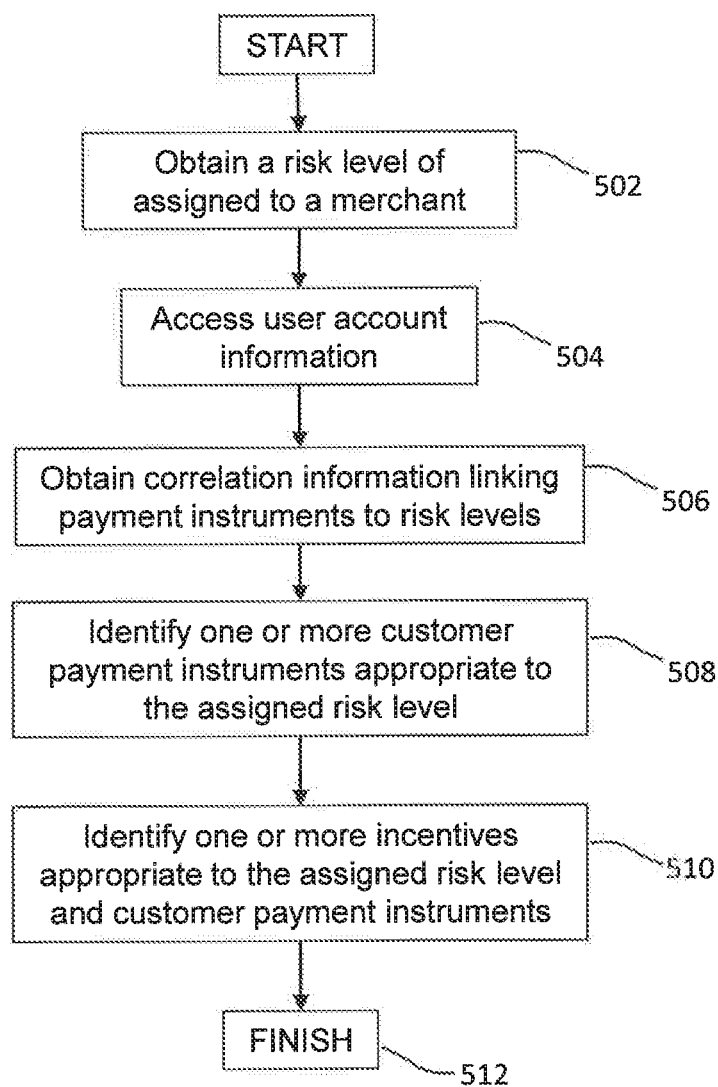
FIG. 5 is a flowchart of an exemplary method for identifying payment instruments based on risks of fraudulent activity, consistent with disclosed embodiments.

FIG. 5 illustrates an exemplary process 500 for identifying payment instruments and incentives based on risks of future fraudulent activity, consistent with disclosed embodiments. In one embodiment, process 500 may be performed by system 140. As described herein, system 140 may be configured to obtain information identifying a merchant (e.g., a physical or electronic merchant) from user device 104, and determine a level of risk associated with the identified merchant (e.g., as described above in reference to FIG. 3). For example, process 500 may be may be incorporated into step 316 of FIG. 3 to identify one or more payment instruments held by user 110 that are appropriate to an elevated risk level assigned to the identified merchant by system 140 (e.g., in step 314 of FIG. 3).

In step 502, system 140 may obtain a risk level assigned to the identified merchant. As described above in reference to FIG. 3, system 140 may be configured to determine a fraud risk score for the identified merchant based on prior reported instances of fraudulent activity, and assign a level of risk to the identified merchant based on a comparison of the determined fraud risk score with a threshold fraud risk score. In other aspects, system 140 may access a corresponding data repository (e.g., risk data 144D of data repository 144) and obtain the risk value assigned to the identified merchant. In certain aspects, assigned risk values consistent with the disclosed embodiments include, but are not limited to, "low," "medium," "high," and "extremely high."

In step 504, system 140 may access a corresponding data repository (e.g., account data 144B of data repository 144) to obtain data identifying one or more accounts associated with user 110. In certain aspects, as described above, the obtained account data may identify one or more payment instruments, such as a credit card or a debit card, and one or more types of amenities and benefits associated with the payment instruments, such as an enhanced level of protection and/or indemnification against fraudulent activities. The account data may, for example, include information linking user 110 to a corresponding account, and information linking the account to a corresponding benefit or amenity.

In step 506, system 104 may obtain information correlating assigned risk levels with types of payment instruments linked to corresponding varieties of amenities and benefits, and further, with types of incentives established by system 140 and associated with types of payment instruments. In certain aspects, system 140 may access a data repository (e.g., risk data 144D of data repository 144) to obtain the correlation information. By way of example, as described below in reference to FIG. 6, the obtained correlation information may link a level of risk assigned to a particular merchant with one or more recommended payment instruments that reduce an exposure of user 110 to fraudulent activities involving the particular merchant. Further, the obtained correlation information may also link a level of risk assigned to a particular merchant with one or more types of incentives that, when provided to user 110 by system 140, may induce user 110 to use the recommended payment instruments for purchases at the particular merchant.

FIG. 6 illustrates exemplary correlation information 600, consistent with disclosed embodiments. As illustrated in FIG. 6, correlation information 600 links risk levels 602 assigned to a merchant with corresponding types of payment instruments 604 and corresponding types of incentives 606. For example, system 140 may associate a merchant with a "low" risk level for fraudulent activities, and correlation information 600 may indicate that any type of payment instrument (e.g., cash, pre-paid gift cards, credit cards, and/or debit cards) would be suitable for transactions involving the low-risk merchant without incentives.

Alternatively, for a medium-risk merchant, correlation information 600 may recommend that user 110 initiate transactions using cash, pre-paid gift card, or a credit card, but not a debit card directly linked to an account of user 110 (e.g., a checking, savings, or money market account). Correlation data 600 may also recommend providing user 110 with a 1% discount on purchases made at the medium-risk merchant using cash and/or pre-paid gift cards. Further, for a high-risk merchant, correlation information 600 may further limit a variety of recommended payment instruments to include cash, pre-paid gift cards, and only those credit cards having an enhanced protection against fraudulent activity, and may recommend providing user 110 with a 2% discount on purchases made at the medium-risk merchant using cash and/or pre-paid gift cards. Finally, for a merchant associated with an extremely high risk of fraudulent activity, correlation information 600 may recommend that user 110 use only cash or pre-paid gift cards, and may recommend providing user 110 with a 4% discount as an incentive to use cash or the pre-paid gift cards for purchases at the extremely-high-risk merchant.

The disclosed embodiments are, however, not limited to incentive types that include discounts on purchases at particular merchants using particular payment instruments. In other embodiments, incentive types consistent with the disclosed embodiments may include, but are not limited to, physical and/or electronic coupons provided to user 110 by system 140, an increase in a points balance associated with a rewards or loyalty account held by user 110, and any additional or alternate incentive appropriate to business entity 150 and deemed capable of inducing user 100 to utilize one or more of the recommended payment instruments appropriate to the risk level of particular merchants.

The disclosed exemplary embodiments are, however, not limited to incentive types sharing common physical or virtual formats with their associated recommended payment instruments. By way of example, and using any of the exemplary techniques outlined above, system 140 (and/or user device 104) may identify a virtual pre-paid gift card as a payment instrument appropriate to the risk level of the particular merchants, and may identify a physical pre-paid gift card as an appropriate incentive. Further, by way of example, system 140 (and/or user device 104) may identify a physical credit card as a payment instrument appropriate to the risk level of particular merchants, and may further identify a virtual gift card, which may be loaded into user 110's mobile wallet, as an associated incentive. In some aspects, the linkage between a virtual incentive and an appropriate physical payment instrument may provide an incentive for user 110 to not only use the appropriate payment instrument in transactions involving the particular merchants, but also foster interaction with a new of existing mobile wallet.

In certain aspects, the disclosed embodiments may generate and store information reflecting correlation information, such as that exemplified in FIG. 6. For example, system 140 may generate and store correlation information in one or more data structures that are accessible, and usable by one or more processors and software executed by processor(s) to perform one or more operations consistent with disclosed embodiments.

Referring back to FIG. 5, system 140 may select one or more payment instruments of user 110 that are consistent with the assigned risk level (e.g., step 508) and one or more types of incentives associated with the selected payment instruments and correlated to the assigned risk level (e.g., in step 510). In one embodiment, system 140 may use the obtained correlation information (e.g., correlation information 600) to identify one or more candidate payment instruments and associated incentive types consistent with the level of risk assigned to the identified merchant. System 140 may select one or more of the payment instruments associated with or held by user 110 that correspond to the candidate payment instruments. In certain aspects, system 140 may determine that each of the identified payment instruments of user 110 are consistent with the level of risk assigned to the identified merchant, or alternatively, that none of the identified payment instruments of user 110 are consistent with the assigned level of risk. For example, when none of the identified payment instruments are consistent with the assigned level of risk, system 140 may select "cash" in step 508 as the only payment instrument associated with the assigned level of risk.

For example, the identified merchant may represent a merchant (e.g., Merchant 1) in Arlington, Va., and system 140 may determine that the merchant is associated with a high risk of fraudulent activity. Further, system 140 may determine (e.g., based on account information 144B) that user 110 holds a debit card linked to a checking account, a pre-paid gift card, a first credit card with a loyalty program, and a second credit card linked to enhanced fraud protection. System 140 may, for example, access correlation information 600 in step 506 to determine that cash, the pre-paid gift card, and the second credit card linked to enhanced fraud protections represent payment instruments appropriate for use with a high-risk merchant. System 140 may further determine in step 508 that the first credit card held by user 110 (e.g., which is associated with a loyalty program but no fraud protection) is inconsistent with the high level of risk assigned to the restaurant. Further, in step 510, system 140 may determine based on correlation data 600 that incentive types appropriate to the selected payment instruments include a 2% discount on all purchases made using cash or the pre-paid gift cards (e.g., to incentive user 110 to make purchases using payment instruments associated with a minimum risk of future fraudulent activity). Further, in additional embodiments, system 140 (and/or user device 104) may identify multiple payment instruments appropriate to assigned level of risk (e.g., in step 508, above) that may be used in combination for one or more purchases at the identified retailer. For example, using any of the exemplary techniques outlined above, system 140 (and/or user device 104) may determine that user 110 holds (i) a first pre-paid gift card having a $25.00 value, (ii) a second pre-paid gift card having a $50.00 value, and (iii) a credit card associated with enhanced fraud protection. System 140 and/or client device 104 may also determine that each of the identified payment instruments is appropriate to the level of risk assigned to the identified merchant. If user 110 were contemplating a purchase transaction of $75.00, system 140 (and/or client device 104) may, using any of the exemplary techniques outlined above, recommend that user 110 utilize a combination of the first and second pre-paid gift cards to cover the full transaction amount of $75.00. Alternatively, if user were contemplating a purchase transaction of $95.00 from the identified retailer, system 140 (and/or client device 104) may recommend that user 110 utilize a combination of the first and second pre-paid gift cards to cover a portion of the full transaction amount (e.g., up to $75.00), and use the credit card to cover the remaining portion of the transaction amount.

Upon selection of the one or more payment instruments and associated incentive types appropriate to the assigned level of risk, exemplary process 500 is complete in step 512. In certain aspects, information identifying the one or more selected payment instruments may be output to step 318 of exemplary process 300, which generates an elevated risk alert, as described below.

Referring back to FIG. 3, system 140 may generate an elevated-risk alert in step 318 that alerts user 110 to the elevated risk of future fraudulent activity associated with transactions involving the selected merchant. In other embodiments, the elevated risk alert may identify one or more payment instruments that would be appropriate for use in transactions involving the selected merchant (e.g., one or more of the virtual and physical payment instruments outlined above, either alone or n a recommended combination), and further, one or more of incentive types associated with corresponding ones of the identified payment instruments. In one embodiment, the elevated-risk alert generated by system 140 may include information that identifies selected merchant, and further, the level of risk assigned to the selected merchant. For example, as described herein, system 140 may generate an elevated-risk alert for Merchant 1 that identifies the high risk of future fraudulent activity assigned to Merchant 1. In some embodiments, the elevated risk alert may include information identifying one or more payment instruments held by user 100 and appropriate for purchases of goods and services at Merchant 1. Additionally or alternatively, the elevated risk alert may include identify one or more of the incentive types associated with the payment instruments, either with or without information explicitly identifying the risk level. In step 320, system 140 may transmit the elevated-risk alert to user device 104 across network 120 using any of the communications protocols outlined above.

Additionally or alternatively, the generated elevated-risk alert may identify reported instances of fraudulent activity associated with the selected merchant over one or more time periods. For example, while an alert generated by system 140 in step may indicate a "high" risk of future fraudulent activity involving the selected merchant, the generated alert may also provide information that the reported instances of fraudulent activity involving the selected merchant decreased over the past two weeks, or alternatively, increased over the past two weeks. In certain aspects, the inclusion of information identifying trends in reported instances of fraudulent activity may reward the selected merchant for remedial actions taken to address fraudulent activity, or alternatively, may penalize the selected merchant for a lack of such remedial action. The disclosed embodiments are not limited to such exemplary data, and in further embodiments, elevated-risk alerts consistent with the disclosed embodiments may include any additional or alternate information that enables user 110 to characterize an existence or pervasiveness of past or future fraudulent activity involving the selected merchant.

Upon transmission of the generated alert to user device 104, system 140 may determine in step 322 whether additional merchants (e.g., as identified in step 304) require risk analysis. If additional merchants require risk analysis (e.g., step 320; YES), exemplary process 300 may pass back to step 306, and system 140 may select an additional one of the identified merchants for risk analysis, as described above. If, however, system 140 determines that no additional merchants await risk analysis (e.g., step 322; NO), then exemplary process 300 is complete in step 324.

Referring back to step 312, if system 140 determines that the fraud risk score of the selected merchant fails to exceed the threshold risk value (e.g., step 312; NO), system 140 may determine in step 326 that the selected merchant represents a low risk for future fraudulent activity. For example, in FIGS. 4A and 4B, system 140 may establish a normalized score of forty as threshold risk score 420, and system 140 may determine that any merchant having a normalized score less than threshold risk score 420 represents a low risk for future fraudulent activity.

In step 328, system 140 may identify one or more payment instruments available to user 110 that are appropriate to the low-risk level assigned to the selected merchant, and additionally or alternatively, one or more incentives (e.g., discounts or coupons) that may induce user 110 to make purchases using the payment instruments. For example, and as described above, system 140 may obtain information correlating assigned risk levels with types of payment instruments linked to corresponding varieties of amenities and benefits (e.g., as stored within risk data 144D of data repository 144). In some aspects, system 140 may process the obtained correlation information to identify candidate payment instruments appropriate to reduced-risk level assigned to the selected merchant, to identify one or more of the candidate payment instruments available to and held by user 110, and further, to identify one or more incentive types associated with the candidate payment instruments and appropriate for the reduced-risk level. By way of example, system 140 may implement the exemplary processes described above in reference to FIG. 5 to identify the one or more payment instruments and the one or more incentive types in step 328.

In certain aspects, system 140 may generate a reduced-risk alert that informs the user of the reduced risk of future fraudulent activity associated with transactions involving the selected merchant (e.g., step 330). In certain aspects, the low-risk alert may include information identifying the selected merchant and further, information indicating to user 110 the reduced risk of future fraudulent activity and the one or more payment instruments (and additionally or alternatively, the one or more incentive types) appropriate for use in transaction involving the selected merchant. System 140 may transmit the generated reduced-risk alert to user device 104 in step 320 using any of the communications protocols described above.

In certain aspects, and as described above, system 140 may determine in step 322 whether additional ones of the identified merchants require analysis, as described above. If additional merchants await risk analysis (e.g., step 322; YES), exemplary process 300 may pass back to step 306, and system 140 may select an additional one of the identified merchants for risk analysis, as described above. If, however, system 140 determines that no additional merchants await risk analysis (e.g., step 322; NO), then exemplary process 300 is complete in step 324.

In the embodiments described above, when the fraud risk score of the selected merchant fails to exceed the threshold risk value (e.g., step 312; NO), system 140 may identify payment instruments held by user 110, and additionally or alternatively, incentive types associated with the identified payment instruments, that are appropriate to the reduced level of risk (e.g., step 328), and may generate and provide a reduced-risk alert to user device 104 (e.g., steps 320 and 330). In additional embodiments, system 140 may decline to provide a reduced-risk alert to user device 104 when the fraud risk score of the selected merchant fails to exceed the threshold risk value (e.g., step 312; NO). For example, user 110 may specify, through a web page or graphical user interface (GUI) presented by user device 104, one or more alert preferences in which user 110 elects not to receive alerts for merchants associated with reduced levels of risk. System 140 may, in some embodiments, access the alert preferences of user 110, and determine not to generate or provide the reduced-risk alert to user device 104 in accordance with accessed alert preferences. For example, when user 110 elects not to receive reduced-risk alerts, system 140 may determine in step 326 that the selected merchant represents a low risk for future fraudulent activity, and may determine in step whether additional ones of the identified merchants require analysis, as described above (e.g., step 322).

In the embodiments described above, system 140 may provide user device 104 with information (e.g., elevated-risk alerts and/or low-risk alerts) that identify risks of future fraudulent activity associated with transactions involving one or more merchants. Upon receipt of the information, user device 104 may render the received information and display the received information as a risk notification to user 110 within a corresponding display region or display pane of user device 104. In certain aspects, user device 104 may be configured to present the received information to user 110 before user 110 initiates a financial transaction (e.g., purchases of goods or services) with the merchants.

In some embodiments, system 140 may provide user device 104 with an alert that identifies the risk of future fraudulent activity associated with transactions involving one or more merchants, and further, one or more of payment instruments appropriate to the risk level associated with these transactions. User device 104 may be configured to render and present the received alert to user 110 as a notification of the risk of fraudulent activity involving the one or more merchants. In certain aspects, risk notifications consistent with the disclosed embodiments may include textual and/or graphical content that enables user 110 to identify and characterize a level of risk associated with a transaction involving a particular merchant, to identify one or more payment instruments and associated incentive types appropriate to the level of risk assigned to that merchant.

Figure 7A:
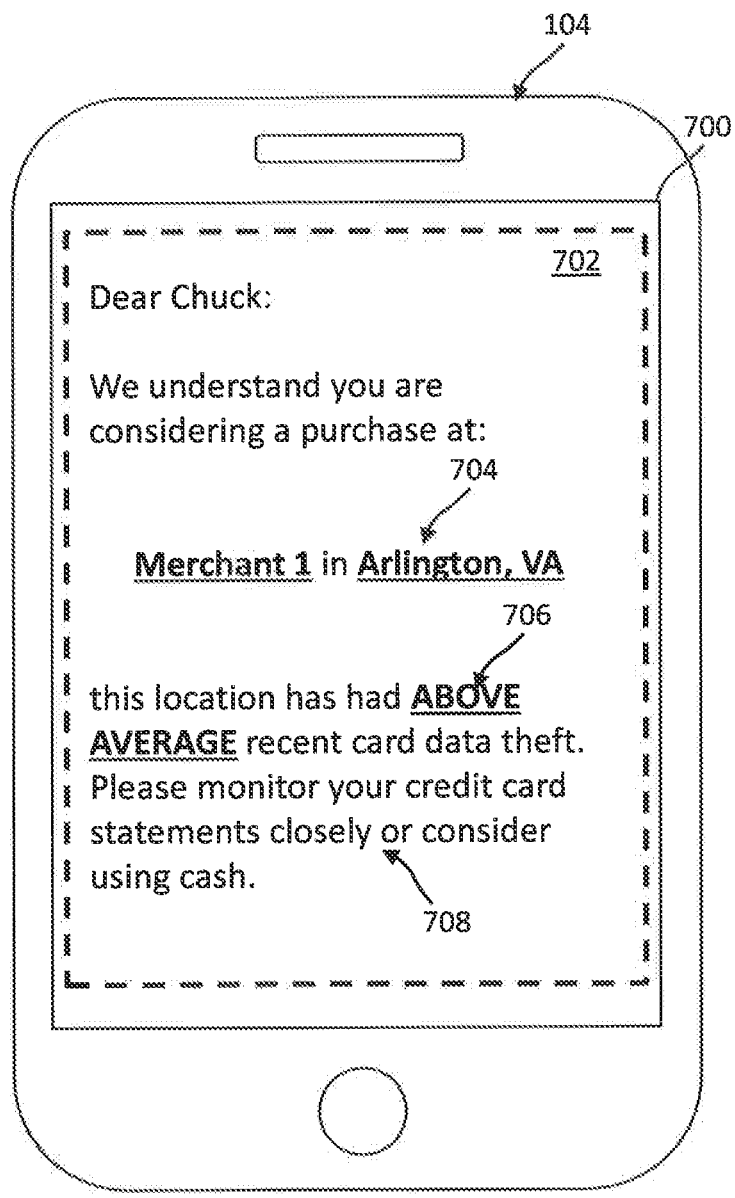
FIGS. 7A-7D and 8A-8B are diagrams of exemplary elevated-risk alerts and reduced-risk alerts, consistent with disclosed embodiments.

In some aspects, user device 104 may render and present the risk notifications within a portion of a viewing pane or corresponding display unit. FIG. 7A depicts an exemplary risk notification that may be provided by disclosed embodiments. For example, in one embodiment, user device 104 may be a smartphone with a display device having touch-screen capabilities via viewing pane 700. User device 104 may be any type of computing device, however, and the representation of FIG. 7A is for exemplary purposes only.

In FIG. 7A, client device 104 may include one or more viewing panes 700 that display on an interface one or more textual and/or graphical risk notifications, such as risk notification 702. In some aspects, risk notification 702 may comprise all or a portion of the viewing pane 700 of client device 104. In other aspects, risk notification 702 may "pop-up" in front of other user interface elements (e.g., web browsers, social media applications, etc.) displayed on viewing panes 700. By way of example, notification 702, when displayed in viewing pane 702, may obscure a portion of the other user interface elements, or may be partially transparent to enable user 110 to view at least a portion of the other user interface elements displayed beneath risk notification 702.

By way of example, system 140 may determine that a merchant (e.g., Merchant 1) in Arlington, Va., is associated with a high risk of fraudulent activity (e.g., an above-average rate of card data theft), and further, that user 110 holds a debit card linked to a checking account, a first credit card with a loyalty program, and a second credit card linked to enhanced fraud protection. In certain aspects, and using the processes described above, system 140 may determine that the cash and the second credit card linked to enhanced fraud protections represent payment instruments appropriate for use with the high-risk merchant.

As illustrated in FIG. 7A, risk notification 702 may include region 704, which identifies the merchant (e.g., Merchant 1) and its location (e.g., Arlington, Va.), and region 906 that indicates the identified merchant is associated with an above-average risk of future fraudulent activity. For example, the future fraudulent activity may include, but is not limited to, above-average instances of reported credit and debit card data theft. Further, in some aspects, risk notification 702 may also include region 708 that provides a recommendation that user 110 monitor credit card statements or consider using an alternate payment instrument (e.g., cash) in view of the above-average instances of reported fraudulent activity.

In additional embodiments, user device 104 may render and present to user 110 a risk notification that not only identifies an elevated risk of future fraudulent activity, but also identifies one or more payment instruments held by user 110 that would be appropriate for use in transactions involving the identified merchant. For example, in FIG. 7B, risk notification 712 may include a region 714 that identifies the merchant (e.g., Merchant 1) and its location (e.g., Arlington, Va.), and a region 716 that indicates the identified merchant is associated with an above-average risk of future fraudulent activity. As described above, the future fraudulent activity may include, but is not limited to, instances of reported credit and debit card data theft.

Figure 7B:
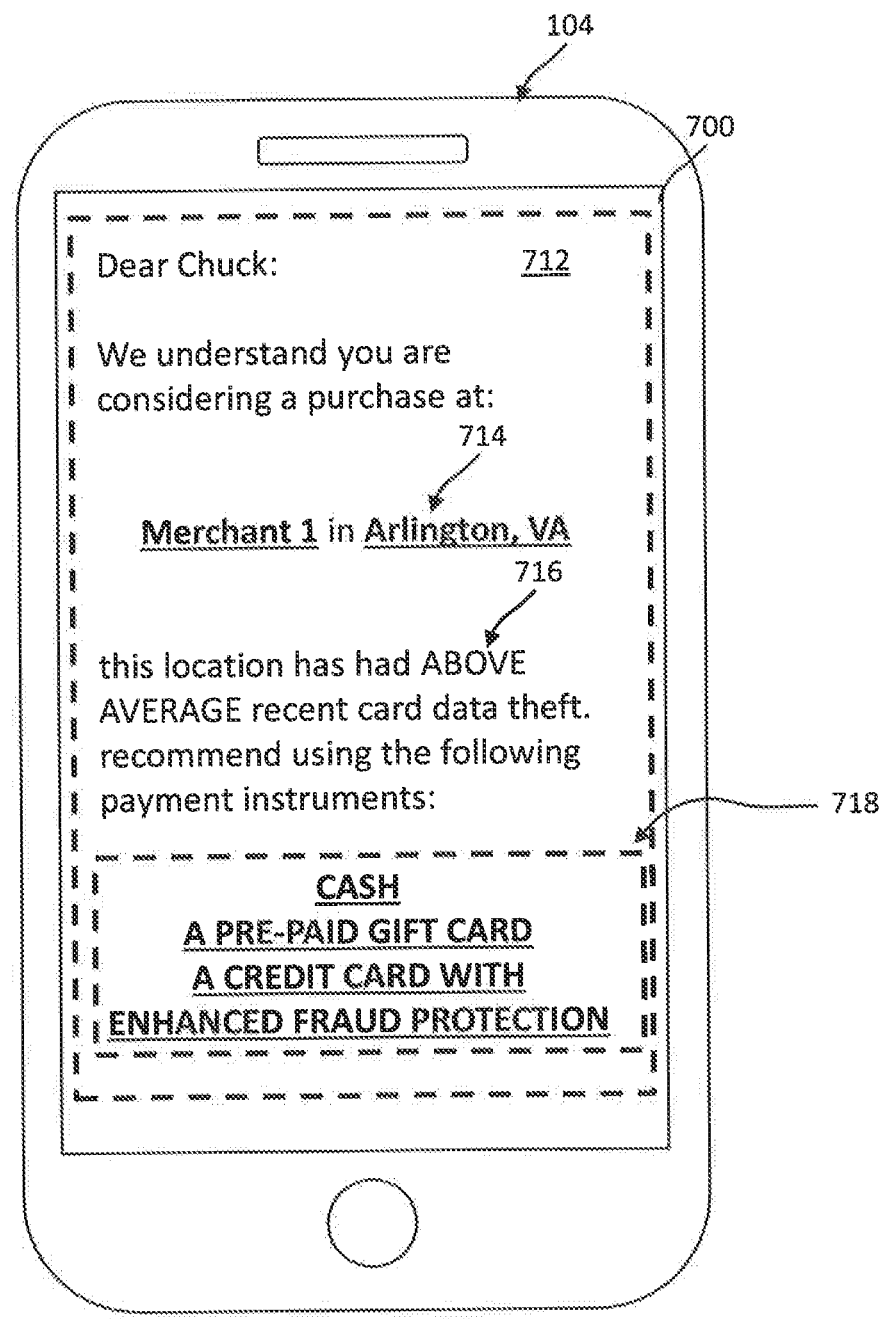

Risk notification 712 may also include a region 718 that provides, to user 110, recommendations for specific payment instruments that would be appropriate for use in transactions involving Merchant 1 in Arlington, Va. For example, as described above, system 140 may determine that cash, a pre-paid gift card, and a credit card linked to enhanced fraud protections represent payment instruments appropriate for transactions involving the elevated-risk merchant. As illustrated in FIG. 7B, region 718 identifies cash and the credit cards linked to enhanced fraud protections as recommended payment instruments for transactions involving Merchant 1 in Arlington, Va.

In certain aspects, the disclosed embodiments may be configured to provide elevated-risk alerts and notification that include information enabling user 110 to quickly characterize and understand the level of risk of future fraudulent activity. For example, as described above, risk notifications presented by user device 104 may indicate that a particular merchant is associated with an "above-average recent card data theft." By providing recommended payment instruments to user 110 before user 110 initiates a transaction with the high-risk merchant, risk notifications 702 and 712 enables user 110 to make an intelligent selection of a payment instruments that limits his or her exposure to potential fraudulent activities.

The disclosed embodiments are, however, not limited to such exemplary characterizations. In additional embodiments, elevated risk alerts and risk notifications consistent with the disclosed embodiments may include any additional or alternate data that would enable user 110 to understand and characterize a scope of fraudulent activity associated with a particular merchant. For example, a risk notification presented to user 110 by user device 104 may identify the "above-average" risk of card data theft involving the particular merchant, and may also provide to the user information identifying a recent trend in reported instances of card data theft (e.g., increasing or decreasing reports of card data theft). In other aspects, such data may include, but is not limited to information identifying aggregated statistical measures of reported instances of fraudulent activity, a value associated with the fraudulent activity, a number and value of chargebacks associated with the particular merchant, information identifying a number and/or a nature of reports of criminal activity associated with the particular merchant, and/or a credit rating of the particular merchant.

Figure 7C:
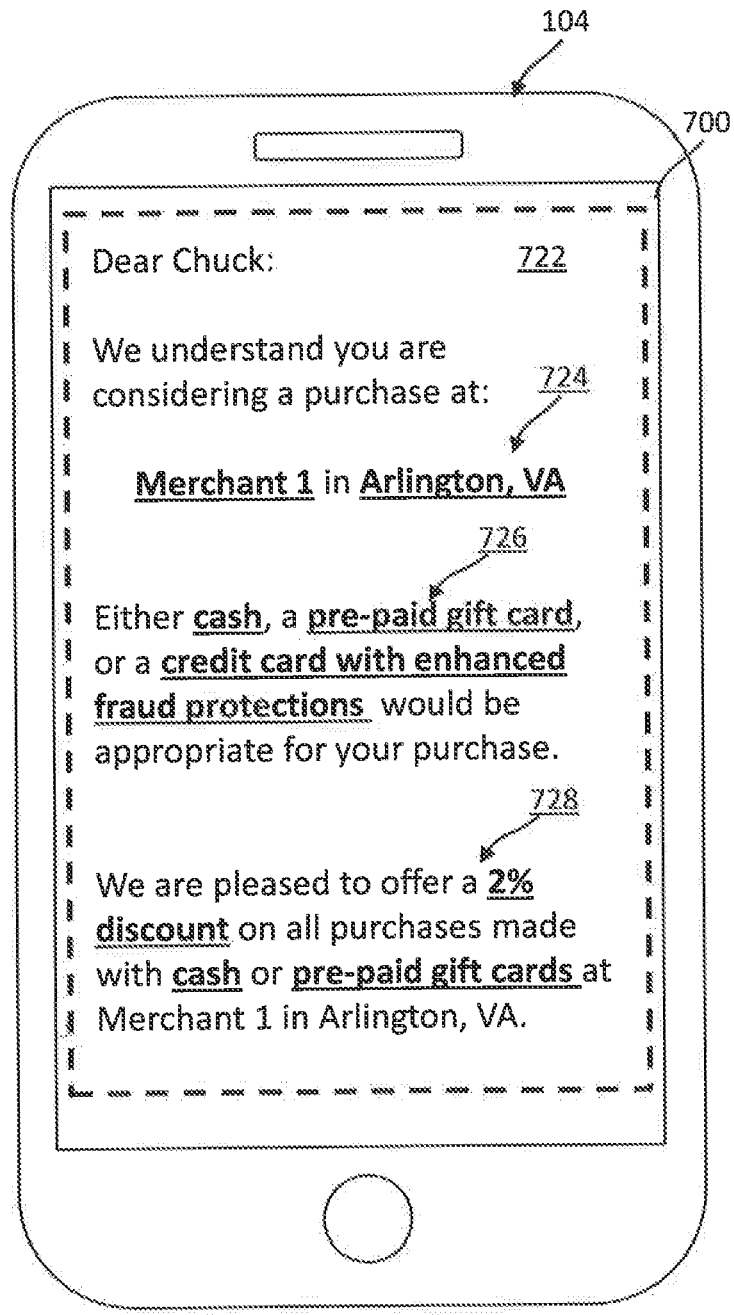

In further embodiments, user device 104 may render and present to user 110 additional risk notifications that identify not only payment instruments appropriate to a risk level of an identified merchant, but also to one or more incentive types that may induce user 110 to use corresponding ones of the identified payment instruments in purchase transactions involving the identified merchant. For example, in FIG. 7C, risk notification 722 may include a region 724 that identifies the merchant (e.g., Merchant 1) and its location (e.g., Arlington, Va.), and a region 726 that provides, to user 110, recommendations for payment instruments that would be appropriate for use in transactions involving Merchant 1 in Arlington, Va. For example, as described above, system 140 may determine that cash, a pre-paid gift card, and a credit card linked to enhanced fraud protections represent payment instruments appropriate for transactions involving the elevated-risk assigned to Merchant 1 in Arlington, Va. As illustrated in FIG. 7C, region 726 identifies cash, the pre-paid gift card, and the credit card linked to enhanced fraud protections as recommended payment instruments for transactions involving Merchant 1 in Arlington, Va.

Further, in FIG. 7C, risk notification 722 may also include region 728 that identifies one or more incentive types associated the at least one of the recommend payment instruments and appropriate to the elevated risk assigned to Merchant 1 in Arlington, Va. For example, as described above, system 140 may determine that the associated incentive types include a 2% discount on all purchases made by user 110 at Merchant 1 in Arlington, Va., using cash or the pre-paid gift card. As illustrated in FIG. 7C, region 728 identifies the 2% discount for purchases using case and/or the pre-paid debit card as appropriate incentive types for transactions involving Merchant 1 in Arlington, Va.

In some embodiments, a particular merchant may be associated with multiple retail locations, which may be associated with varying levels of risk of future fraudulent activity. In certain aspects, system 140 may be configured to generate an elevated risk alert that identifies not only a risk level assigned to a merchant at a particular location, but also additional locations of that merchant associated with reduced levels of risk. By way of example, system 140 may determine that the Arlington, Va., location of Merchant 1 may be associated with a high risk of future fraudulent activity. In some aspects, system 140 may access a corresponding data repository (e.g., risk data 144E or data repository 140), and determine that the Washington, D.C., and Rockville, Md. locations of Merchant 1 are associated with reduced levels of risk for future fraudulent activity. System 140 may, for example, generate an elevated-risk alert identifying the high risk associated with the Arlington, Va. location of Merchant 1 and further, suggesting that user 110 patronize on or more of the Washington, D.C. and Rockville, Md. locations of Merchant 1 that are associated with reduced levels of risk. System 140 may transmit the elevated risk alert to user device 104 across communications network 120 using any of the communications protocols outlined above. User device 104 may be configured to render the elevated risk alert and display risk notification within a corresponding viewing pane 502. For example, the displayed risk notification may include information that identifies an above-average risk of card data theft at the Washington, D.C., location of Restaurant 1, and a recommendation that user 110 should patronize the Rockville, Md. and the Washington, D.C., locations of "Merchant 1," which may experience reduced levels of card data theft (e.g., card skimming.)

In additional embodiments, as described above, system 140 may generate and transmit to user device 104 a reduced-risk alert indicating that a selected merchant is associated with a reduced risk of future fraudulent activity. For example, system 140 may determine that a fraud risk score of Merchant 1 in Arlington, Va., fails to exceed a threshold risk value (e.g., step 312 of FIG. 3; NO), and is thus associated with a reduced risk for future fraudulent activity (e.g., step 326). In certain aspects, system 140 may determine that cash, a debit card linked to a checking account, a first credit card with a loyalty program, and a second credit card linked to enhanced fraud protection represent appropriate payment instruments (e.g., step 328), and may generate and transmit a corresponding reduced-risk alert to user device 104 (e.g., steps 330 and 320).

Figure 7D:
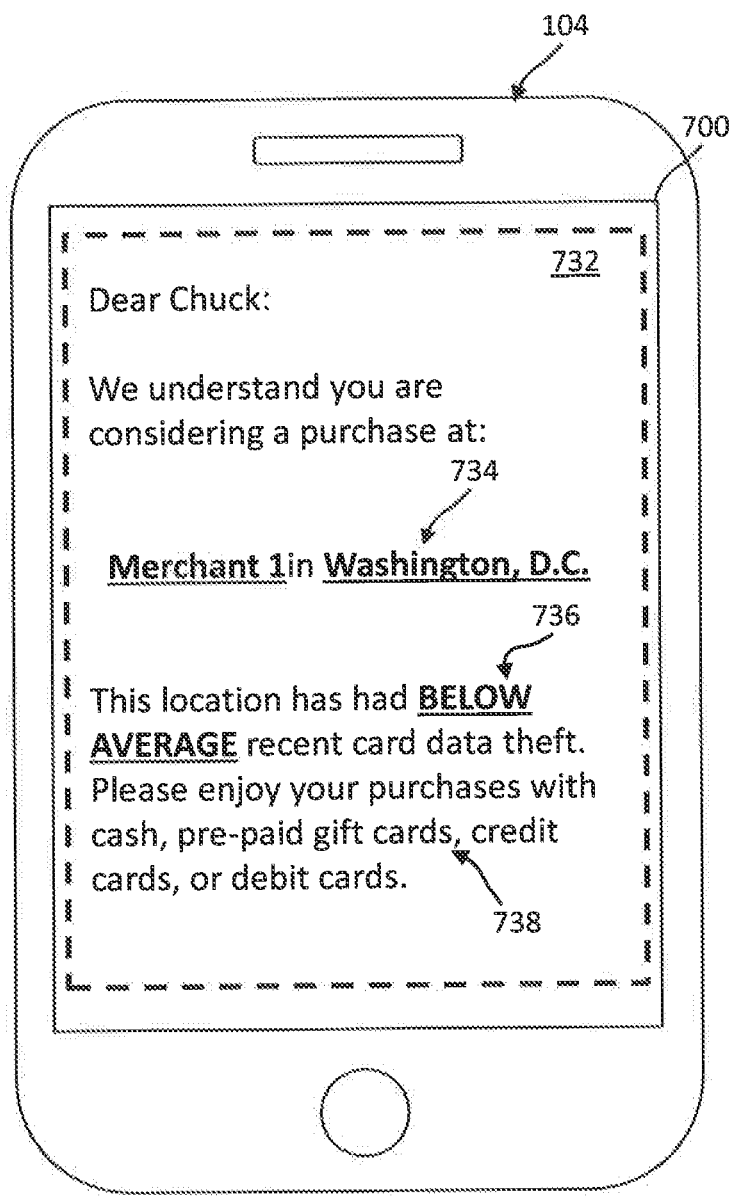

In some aspects, user device 104 may be configured to receive the reduced-risk alert, and render the received alert for presentation to user 110 within a corresponding viewing pane or display unit. FIG. 7D illustrates an exemplary reduced-risk notification 732 that may be presented on a viewing pane of user device 104, consistent with the disclosed embodiments. As illustrated in FIG. 7D, risk notification 732 may include region 734, which identifies the merchant (e.g., Merchant 1) and its location (e.g., Washington, D.C.), and region 736 that indicates the identified merchant is associated with an below-average risk of future fraudulent activity (e.g., instances of reported credit and debit card data theft). Further, in some aspects, risk notification 722 may also include region 728 that indicates to user 110 that cash, credit cards, and/or debit cards represent appropriate payment instruments for transactions involving the reduced-risk merchant.

Further, in some embodiments, the risk notifications described above may identify a plurality of merchants associated with corresponding request received by system 140 (e.g., merchants identified to system 140 by user device 104, merchants disposed proximate to a location provided to system 140 by user device 104, and/or merchants included within image data provided to system 140 by user device 104 identified in step 304, as described above.) Further, in an embodiment, the displayed risk notifications may not identify a particular merchant or collection of merchants. By way of example, risk notifications consistent with the disclosed embodiments may indicate that merchants within a particular geographic region are associated with an above-average risk of fraudulent activity, In other embodiments, system 140 (and/or user device 104) may identify one or more groups of merchants that exhibit common characteristics disposed proximate to a current position of user device 104 and/or user 110, and additionally or alternatively, are disposed within a geographic that includes the current position. The common characteristics exhibited by the identified groups of merchants may include, but are not limited to, common merchant types, common merchant classes, and common products, types of products, and/or classes of products offered for sale. In certain aspects, the displayed risk notifications may indicate, to the user, a level of risk assigned to a particular of group of merchants sharing common characteristics and disposed proximate to, or which a geographic region that include, the current position of user device 104 and/or user 110.

In certain aspects, user 110 may provide, as input to user device 104 (e.g., through a web page or other interface provided by system 140) information specifying at least one of the common characteristics (e.g., as a search query or as part of a use profile). System 140 (and/or user device 104) may identify one or more groups of merchants that share the specified at least one common characteristics and are disposed proximate to, or in a geographic region that includes, the current position. Further, and using any of the exemplary techniques described above, system 140 (and/or user device 104 may generate risk notifications indicative of a risk level assigned to the identified groups of merchants. For example, the risk notifications may indicate that electronic merchants disposed in a geographic region that includes the current position experience above-average risks of fraudulent activity, which used-book merchants disposed proximate to the current position experience a low risk of fraudulent activity. Further, by way of example, the risk notifications may indicate that small, "mom-and-pop" merchants disposed proximate to the current position experience below-average risks of fraudulent activity, which large, "big-box" merchants disposed in a geographic region that includes the current position experience an above-average risk of fraudulent activity. The disclosed embodiments are, however, not limited to these exemplary merchant and product characteristics, and in further embodiments, the risk notification may identify the risk level assigned to any of the appropriate grouping or segment of merchant disposed proximate to, or in a geographic region that includes, the current position of user device 104 and/or user 110.

In some embodiments, user device 104 may be configured to render the received elevated-risk and reduced-risk alerts and provide to user 110 a color-based graphical indicator of the levels of risk associated with the merchant. In certain aspects, the color-based graphical indicator may enable user 110 to ascertain quickly a risk level associated with a particular merchant, and to make an informed decision that reduces an impact of card skimming and other forms of fraudulent activity on financial accounts and payment instruments held by user 110 before initiating transactions.

By way of example, user device 104 may indicate a low risk of fraudulent activity using a blue or green color-based indicator, while an extremely high risk of fraudulent activity may be associated with a red color-based indicator. Similarly, user device 104 may associate a medium risk of fraudulent activity with a yellow color-based indicator, and a high risk of fraudulent activity may be associated with an orange color-based indicator. The disclosed embodiments are, however, not limited to such exemplary associations between color-based indicators and risk levels, and in further embodiments, user device 104 may associate risk levels derived from received alerts with any additional or alternate color appropriate to the risk levels, user device 104, and user 110. Further, graphical indicators consistent with the disclosed embodiments may include any of a number of visual effects (e.g., flashing indicators, indicators with varying brightness, etc.), which user device 104 may correlate with corresponding risk levels.

Figure 8A:
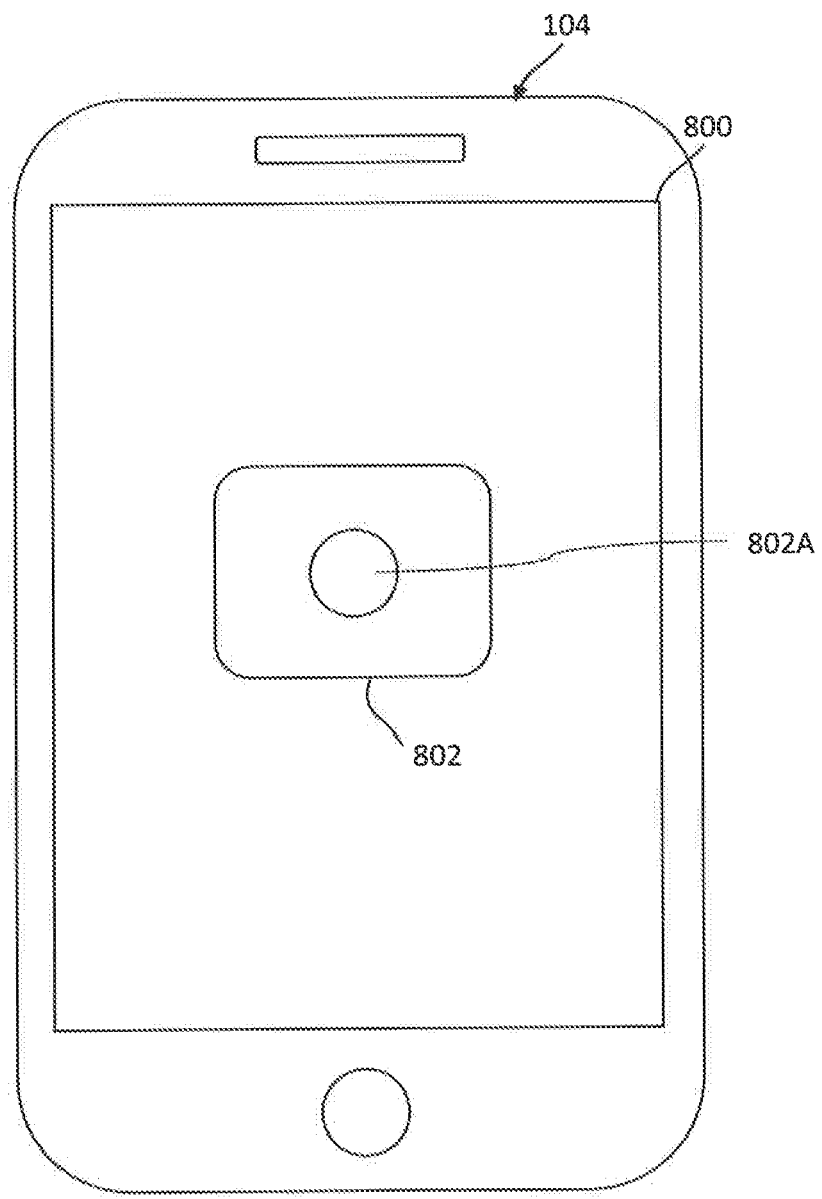

In some aspects, user device 104 may present the color-based graphical indicator as a risk notification within a portion of a viewing pane or corresponding display unit. FIG. 8A depicts an exemplary color-based graphical indicator that may be presented within a viewing pane of user device 104, consistent with certain disclosed embodiments. In FIG. 8A, client device 104 may include one or more viewing panes 800 that display on an interface one or more graphical representations, such as alert 802. In some aspects, alert 802 may comprise all or a portion of viewing pane 800 of client device 104 (e.g., as depicted in FIG. 5A). In other aspects, alert 802 may "pop-up" in front of other user interface elements (e.g., web browsers, social media applications, etc.) displayed on viewing panes 700. By way of example, alert 802, when displayed in viewing pane 800, may obscure a portion of the other user interface elements, or may be partially transparent to enable user 110 to view at least a portion of the other user interface elements displayed beneath alert 802.

In an embodiment, alert 802 may include a color-based graphical indication 802A indicative of a risk level associated with a corresponding merchant. For example, user 110 at user device 104 may request information identifying a risk of fraudulent activity associated with a particular merchant (e.g., Merchant 1), and system 140 may provide an elevated-risk alert indicating that potential transactions involving the particular merchant are associated with an high risk of fraudulent activity. User device 104 may, for example, be configured to display alert 802 within viewing pane 800, and to display an orange graphical indicator 802A indicative of the extremely high risk of fraudulent activity.

In other embodiments, user device 104 may receive elevated-risk and/or low-risk alerts associated with a several merchants within a geographic region. By way of example, user device 104 may transmit geographic information identifying a current position of user device 104 and/or user 110 to system 104 as a request to obtain information identifying risks of fraudulent activity associated with merchants disposed proximate to the current position.

For example, system 140 may identify three merchants disposed proximate to, or within a threshold distance of, the received geographic information (e.g., Merchant 1, Merchant 2, and Merchant 3). Further, by way of example, system 140 may determine that Merchant 1 represents a high risk of potential fraudulent activity, that Merchant 2 represents a medium risk of potential fraudulent activity, and further, that Merchant 3 represents a low risk of potential fraudulent activity. System 140 may generate and transmit elevated-risk alerts to user device 104 that indicate the high and medium levels of risk assigned to Merchant 1 and Merchant 2, and may generate and transmit a reduced-risk alert to user device 104 that indicated the low level of risk assigned to Merchant 3.

Figure 8B:
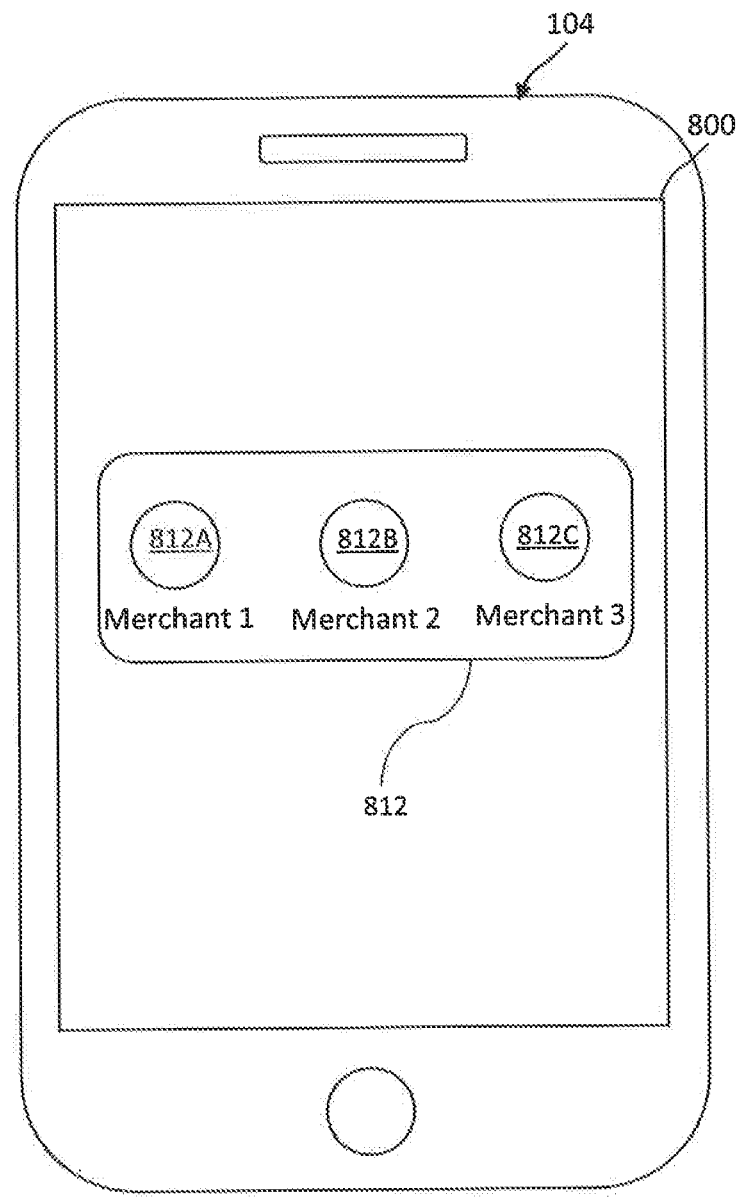

As illustrated in FIG. 8B, user device 104 may be configured to render and display, within viewing pane 800, an alert 812 that includes color-based graphical icons indicating risks of future fraudulent activity involving Merchant 1, Merchant 2, and Merchant 3. Further, in FIG. 5B, alert 504 may include an orange indicator 812A indicative of the high risk associated with Merchant 1, a yellow indicator 812B indicative of the medium risk associated with Merchant 2, and a green indicator 812C indicative of the low risk associated with Merchant 3.

In other embodiments, one or more of the risk notifications described above may be supplemented by, or alternatively, replaced by, a tactile or audible alert generated by user device 104 that notifies user 110 of an above-average risk of fraudulent activity.

In some aspects, user device 104 may be configured to associate a risk level of a particular merchant with characteristics of a corresponding audible alert (e.g., one or more risk levels may be associated with audible alerts having corresponding alert tones, durations, etc.) and a corresponding tactile alert (e.g., one or more risk levels may be associated tactile alerts having corresponding vibration intensities, durations, etc.). For example, in addition to presenting risk notification 702 in FIG. 7A, user device 104 may also emit an audible alert having a corresponding alert tone, and further, may vibrate for a corresponding duration. In certain embodiments, user 110 may configure one or more of the alert tones to include user-specified audio content.

In certain embodiments, as described above, user device 104 represent one or more wearable computing devices, which may include, but are not limited to, smart watches, wearable activity monitors, wearable smart jewelry, and glasses and other optical devices that include optical head-mounted displays (OHMDs). In one embodiment, one or more textual risk notifications (e.g., risk notification 712 of FIG. 7B) may be delivered to and presented by a wearable computing device using any of the techniques described above. Further, in some aspects, a wearable computing device may present, to user 110, a visual, audible, and/or tactile risk notification without requiring input or instruction from user 110.

By way of example, and as described above, system 140 may determine that a merchant is associated with an extremely-high risk of future fraudulent activity, and may transmit a corresponding elevated-risk alert to a wearable computing device, such as a smartwatch. In certain aspects, the smartwatch may receive the elevated-risk alert and may "glow" orange when in proximity to the merchant. In other aspects, the smartwatch (or any additional or alternate wearable computing device) may provide an audible notification (e.g., a pulsed tone) or a tactile notification (e.g., a vibration), either alone or in combination with the visual notification. Further, in some embodiments, a wearable computing device may tailor a presented visual notification, audible notification, and/or tactile notification to received alerts associated with various levels of merchant risk (e.g., a smartphone may glow green in response to a reduced-risk alert, or may emit different audible tones in response to different levels of risk).

Further, in certain aspects, a wearable computing device may represent "smart" glasses that include an optical head-mounted display (OHMD). By way of example, the smart glasses may receive an elevated-risk alert from system 140 using any of the techniques described above, and may present a corresponding risk notification (e.g., risk notification 712 of FIG. 7B) to user 110 through the OHMD. In certain aspects, the OHMD may present risk notification 712 as an augmented reality (AR) view that "pop-ups" within a field of view of user 110. For example, the AR view of risk notification 712 may be presented proximate to a corresponding merchant by the OHMD such that user 110 views risk notification 712 upon glancing towards the corresponding merchant.

In additional embodiments, a wearable computing device may be embedded into an article of clothing, which may include an electronic fabric or a smart textile. By way of example, a wearable computing device embedded into an element of outerwear (e.g., a pair of gloves) formed from an electronic fabric or smart textile. In certain aspects, and in response to an elevated-risk alert or a reduced-risk alert received from system 140, the wearable computing device may execute software instructions that cause the electronic fabric or smart textile to modify a characteristic of the element of outerwear in a manner perceptible to user 110. For example, upon receipt of an elevated-risk alert, the wearable computing device, in conjunction with the electronic fabric or smart textile, may modify a surface characteristic of the gloves to render them "bumpy" to the touch of user 110, or to warm the gloves in a manner perceptible to user 110.

In the exemplary embodiments disclosed above, system 140 may determine risks of fraudulent activity for one or more merchants having retail locations disposed within a geographic region. The disclosed embodiments are, however, not limited to such "physical" merchants, and in additional embodiments, the exemplary processes described above may be executed by system 140 to determine a risk of fraudulent activity associated with an "electronic" merchant associated with a corresponding URL address of IP address. For example, as described above, user device 104 may collect (e.g., passively) a URL address or IP address of an electronic merchant entered into a web browser by user 110. User device 104 may transmit the collected information to system 140 as a request for information identifying a risk of future fraudulent activity associated with transactions involving the electronic merchant. In some aspects, user device 104 may transmit the request automatically and without user input or instruction. As described above, system 140 may then identify the electronic merchant associated with the received URL address and/or IP address (e.g., by accessing merchant data 144C of data repository 144), and may assign a risk level to the identified electronic merchant. In additional aspects, system 140 may provide recommendations for payment instruments suitable for transactions involving the electronic merchant using any of the techniques outlined above.

Furthermore, in the embodiments described above, system 140 may be configured to perform processes that identify risks of fraudulent activity involving one or more merchants (e.g., process 300 of FIG. 3), and further, that generate recommendations for payment instruments suitable for transactions involving one or more merchants based on assigned risk levels (e.g., process 500 of FIG. 5). In additional embodiments, user device 104 may be configured to perform one more steps of the exemplary processes outlined above. For example, user device 104 may be configured to select a merchant for risk analysis based on obtained merchant information (e.g., steps 302, 304, and 306 of process 300), determine a score for the selected merchant based on prior instances of fraudulent activity, (e.g., step 308 of process 300), compare the determined score against a threshold score and assign a risk level to the selected merchant (e.g., steps 310, 312, 314, and 326 of process 300), identify payment instruments appropriate to the assigned risk levels (e.g., steps 316 and 328 of process 300), and generate information identifying the assigned risk levels and payment instruments (e.g., steps 318 and 330 of process 300). Further, in other embodiments, user device 104 may be configures to perform one or more of steps 502, 504, 506, and 508 of process 500 for identifying recommendations for payment instruments suitable for transactions involving one or more merchants based on corresponding risk levels.

In the exemplary embodiments described above, system 140 may generate and provide risk notifications to user device 104 that identify of one or more payment instruments and/or associated incentive types appropriate to a level of risk of future fraudulent activities involving a merchant before user 110 initiates a purchase of goods or services from that merchant. The disclosed embodiments are, however, not limited to risk notifications linked to a particular physical or electronic merchant. In other embodiments, and using any of the exemplary techniques outlined above, system 140 may aggregate determined risk score and/or assigned risk levels for merchants within a particular geographic region (e.g., a street, neighborhood, zip code, etc.), and may provide additional risk notifications to user 110 that identify payment instruments (and/or associated incentive types) appropriate for the aggregated risk level within the geographic region. In some aspects, system 140 may provide the additional risk notifications when user 110 crosses into the geographic region, and additionally or alternatively, when user 110 is disposed within the particular geographic region. As described above, user device 104 and/or system 140 may determine a geographic location of user 110 based on a positioning system embedded in user device 104, through mapping software executed by user device 104, and/or through data received from an external positioning system.

Further, using any of the exemplary techniques described above, user device 104 may be configured to monitor (e.g., passively) and/or capture a current geographic location of user device 104, and to automatically request information identifying risks of fraudulent activity involving one or more merchants from system 140 without input or intervention from user 110. In some aspects, user device 104 may generate a request for the information that includes geographic information identifying a current geographic location of user 110 (e.g., as obtained from the embedded positioning system) and additionally or alternatively, merchant information identifying a portion of a name of one or more merchants disposed proximate to the current geographic location (e.g., as identified through an optical character recognition (OCR) process applied to digital images captured and/or stored by user device 104), User device 104 may, for example, transmit the generated request to system 140 without user input or intervention, as described above.

In certain aspects, system 140 may receive the request from user device 104 (e.g., in step 302 of FIG. 3). As described above, system 140 may be configured to process the received geographic and/or merchant information to identify one or more merchants associated with the request (e.g., in step 304 of FIG. 3), and further, select one or more identified merchants for further risk analysis (e.g., in step 306 of FIG. 3). In addition, and using any of the exemplary techniques identified above, system 140 may be configured to determine one or more fraud risk scores that indicate an existence and a pervasiveness of prior fraudulent activity involving the one or more selected merchants (e.g., in step 308 of FIG. 3).

In an embodiment, at least one of the determined fraud risk scores may reflect a number of prior reported instances of fraudulent activity involving corresponding ones of the selected merchants. In other aspects, at least one of the determined fraud risk scores may reflect a pervasiveness of prior fraudulent activity involving additional merchants disposed within a geographic region that includes at least one of the selected merchants (e.g., within the same neighborhood, along the same street, etc.). Additionally, the determined fraud risk scores may represent "objective" scores, which system 140 may be configured to adjust in accordance with one or more subjective factors. As described above, subjective factors consistent with the disclosed embodiments may include, but are not limited to, temporal variations in reported instances of fraudulent activity involving the selected merchants, a level of cooperation of the selected merchants with police or judicial entities, or information identifying a remedial action taken by the selected merchants.

In an embodiment, system 140 may be configured to transmit, to user device 104, information identifying the one or more determined risk fraud scores and corresponding ones of the selected merchants. For example, user device 104 may execute an application program (e.g., a mobile "app") that causes user device 104 to transmit the request to system 140, and user device 104 may receive the information identifying the determined risk fraud scores and the corresponding selected merchants from system 140 through an API corresponding to the executed application program.

In certain aspects, using any of the exemplary techniques outlined above, user device 104 may execute the application program to assign risk levels to the selected merchants based on the determined risk fraud scores (e.g., steps 310, 312, 314, and 326 of FIG. 3), and further, to identify payment instruments and associated incentive types appropriate to the assigned risk levels (e.g., steps 316 and 328 of FIG. 3, and steps 502, 504, 506, 508, and 510 of FIG. 5). Further, in additional aspects, user device 104 may execute the application program to present one or more risk notifications to user 110 through an interface associated with the executed application program. For example, risk notifications consistent with the disclosed embodiments may include information that identifies the risk of future fraudulent activity in transactions involving the selected merchants, one or more of the payment instruments appropriate to the risk level associated with these transactions, and additionally or alternatively, one or more of the incentive types associated with the payment instruments (e.g., as described above in reference to FIGS. 7A-7D and 8A-8B).

In certain aspects, the application program executed by user 110 may represent a mobile-wallet application provided by or associated with a financial institution (e.g., business entity 150 of FIG. 1). As described above, and after execution by user device 104, the mobile-wallet application may establish a mobile wallet on user device 104 and load the established mobile wallet with one or more eligible financial products held by user 110. Eligible financial products consistent with the disclosed embodiments include, but are not limited to payment instruments and financial services accounts held by customers at a financial institution, prepaid gift cards, loyalty and/or rewards programs, and/or other non-financial service accounts. Further, in some instances, user 110 may initiate a purchase at a merchant (e.g., merchant 190) using the mobile wallet by executing the mobile-wallet application on user device 104, providing input to user device 104 that selects one of the loaded financial products (e.g., a credit card), and by placing user device 104 in proximity to a corresponding terminal device (e.g., terminal device 180). The executed mobile wallet application may cause user device 104 to provide account information associated with the selected credit card to terminal device 10 across an established communications link (e.g., communications link 122) as payment for the initiated purchased, as described above.

In some embodiments, and prior to initiating the purchase, user device 104 may request, from system 140, information identifying fraud risk score for merchant 190 (e.g., as determined by system 140 using any of the exemplary techniques outlined above). After receiving the fraud risk score for merchant 190, the executed mobile-wallet application may cause user device 110 to perform any of the exemplary processes outlined above to assign a risk level to merchant 190, and further, identify one or more incentives to induce user 110 to initiate the purchase transaction using the identified payment instruments. Additionally, in certain aspects, the executed mobile-wallet application may identify a subset of the appropriate payment instruments that are available and loaded into the established mobile wallet (and additionally alternatively, that are otherwise available to user 110, e.g., cash).

By way of example, user device 104 may be disposed proximate to terminal device 180 (e.g., a point-of-sale terminal, a smart phone, a tablet computer, etc.) operated by merchant 190 (e.g., Merchant 1 located in Arlington, Va.), and user 110 may contemplate initiating a purchase of goods and services from merchant 190 using a debit card loaded into user 110's mobile wallet (i.e., as established on user device 104). Prior to initiating the purchase transaction, and without input from user 110, user device 110 may transmit to system 140 a request to obtain a fraud risk score indicative of a risk of future fraudulent activity associated with transactions involving Merchant 1. As described above, the request may specify a current geographic location of user 110 (e.g., as obtained from a positioning system embedded in user device 104) and/or a portion of a name of Merchant 1. The disclosed embodiments are, however, not limited to requests that include such exemplary geographic and merchant information, and in further embodiments, the request may include any additional or alternate information that enables system 140 to uniquely identify merchant 190 and/or terminal device 180 (e.g., an IP address and/or MAC address of terminal device 180 obtained by user device 104 during an initial handshake with terminal device 180).

In some aspects, and using any of the exemplary techniques outlined above, system 140 may determine a fraud risk score for Merchant 1, which system 140 may be configured to transmit to user device 104, Further, in an embodiment, user device 104 may execute an application program (e.g., a mobile-wallet application) that receives the determined fraud risk score (e.g., through a corresponding API), and using any of the exemplary techniques outlined above, assigns a risk level to Merchant 1 and identifies payment instruments appropriate to the assigned risk level and available within user 110's mobile wallet. Additionally, in some aspects, the executed mobile-wallet application may identify one or more incentive types that, when provided to user 110 in conjunction with the appropriate payment instruments, induce user 110 to initiate purchases involving Merchant 1 using corresponding ones of the appropriate payment instruments.

By way of example, and based on the determined fraud risk score, client device 104 may execute the mobile-wallet application to assign an above-average risk of fraudulent activity (e.g., an above-average rate of card data theft) to Merchant 1 in Arlington, Va. Additionally, user device 104 may execute the mobile-wallet application to determine that user 110's mobile wallet is loaded with a debit card linked to a checking account, a prepaid gift card, a first credit card with a loyalty program, and a second credit card linked to enhanced fraud protection.

Using any the processes described above, and after executing the mobile-wallet application, user device 104 may determine that cash (i.e., available to user 110 but not included within user 110's mobile wallet), the pre-paid gift card, and the second credit card represent payment instruments appropriate for use in purchase transactions involving Merchant 1 in Arlington, Va. Further, and as described above, user device 104 may also determine that incentive types appropriate to the identified payment instruments and the above-average risk of fraudulent activity include, but are not limited to, a 2% discount on purchases made from merchant 190 using cash or the prepaid gift card.

As described above, user device 104 may be configured to generate and present, through an interface provided by the executed mobile-wallet application, a risk notification that identifies the appropriate payment instruments (e.g., cash, the pre-paid gift card, and the second credit card) and the identified incentive types (e.g., a 2% discount on purchases made from Merchant 1 using cash or the prepaid gift card). Further, in additional aspects, the presented risk notification may also identify the above-average risk of future fraudulent activity associated with Merchant 1.

In some embodiments, user 110 may provide input to user device 104 (e.g., through a key pad, touch screen, audible command, etc.) indicative of user 110's selection of one of the appropriate payment instruments (e.g., one of cash, the pre-paid gift card, or the second credit card). In response to the provided input, user device 104 may transmit data identifying the selected payment instrument and corresponding incentive (if applicable) to terminal device 180 (e.g., using communications link 122 established by the mobile-wallet application executed by user device 104). For example, user 110 may provide, to user device 104, input selecting the pre-paid gift card for the purchase transaction involving Merchant 1, and client device 104 may transmit information identifying the selected pre-paid gift card and 2% discount to terminal device 180, as described above. In other aspects, user device 104 may transmit information identifying the selected payment instrument and corresponding incentives) to system 140, which may forward the received information to terminal device 180 across network 120 using any of the communication protocols outlined above. In some embodiments, user 110 may provide, to user device 104, input that enables the executed mobile-wallet application to initiate and complete the purchase transaction using the selected payment instrument and in accordance with the identified inventive, if applicable.

In certain aspects, client device 104 may render received or generated risk notifications (e.g., identifying appropriate payment instruments and additionally or alternatively, corresponding incentives) for presentation to user 110 through corresponding interfaces (e.g., interfaces associated with executed mobile-wallet applications). The disclosed embodiments are not limited to these exemplary device-presented notifications, and in further embodiments, user device 104, and additionally or alternatively, system 140, may provide information identifying assigned risk levels, payment instruments appropriate to the assigned risk levels, and/or incentive types associated with the payment instruments to terminal device 180 for presentation on a corresponding interface.

For example, and as described above, user device 104 may determine that Merchant 1 in Arlington, Va., is associated with an above-average risk of future fraudulent activity. Further, by way of example, user device 104 may determine that cash, a pre-paid gift card, and a second credit card linked to enhanced fraud protection are appropriate to the above-average risk, and that appropriate incentives include a 2% discount on purchases made from Merchant 1 using cash or the prepaid gift card. In some aspects, user device 104 may, after execution of a mobile-wallet application, provide information identifying the assigned risk level, appropriate payment instruments, and associated incentive types terminal device 190, which may render the received information for presentation to user 110 through a corresponding interface. By way of example, user device 104 may provide the information to terminal device 190 through communications link (e.g., communications link 122) established by the executed mobile-wallet application during an initial handshake and corresponding exchange of data between user device 104 and terminal device 180.

Other embodiments will be apparent to those skilled in the art from consideration of the specification and practice of the embodiments disclosed herein. It is intended that the specification and examples be considered as exemplary only, with a true scope and spirit of the disclosed embodiments being indicated by the following claims.

What is claimed is:

1. A device, comprising:
a display unit;
a communications interface;
a memory storing software instructions; and
one or more processors coupled to the communications interface and to the memory, the one or more processors being configured to execute the software instructions to perform operations including:
based on a detection of a wireless signal broadcasted by a terminal device of a merchant, presenting, via the display unit, first and second interface elements within a digital interface, the first interface element having a visual characteristic that reflects a risk level of the merchant, and the second interface element identifying a payment instrument consistent with the risk level; and
receiving, via the communications interface, first information associated with a change in the risk level of the merchant; and
via the display unit, modifying the visual characteristic of the first interface element to reflect the change in the risk level.

2. The device of claim 1, wherein the first interface element comprises a graphical icon, the graphical icon having the visual characteristic that reflects the risk level.

3. The device of claim 2, wherein the graphical icon provides a graphical representation of the risk level, and the one or more processors are further configured to perform operations including:

establishing the visual characteristic for the graphical icon in accordance with the risk level of the merchant; and
presenting, via the display unit, the graphical icon in accordance with the established visual characteristic; and
modifying, via the display unit, the visual characteristic of the graphical icon to reflect the change in the risk level.

4. The device of claim 2, wherein the visual characteristic comprises a color of the graphical icon.

5. The device of claim 1, the one or more processors are further configured to perform operations including:
receiving, from a computing system via the communications interface, second information indicative of one or more prior instances of fraudulent activity involving the merchant; and
determining the risk level of the merchant based on the first information, the risk level being indicative of a probability of future instances of fraudulent activity involving the merchant.

6. The device of claim 5, wherein:
the first information identifies one or more additional instances of fraudulent activity involving the merchant, each of the one or more additional instances of fraudulent activity occurring subsequent to the one or more prior instances; and
the one or more processors are further configured to perform operations including:
determining a modified risk level for the merchant based on the first and second information; and
modifying, via the display unit, the visual characteristic of the first interface element in accordance with the modified risk level.

7. The device of claim 5, wherein:
the device further comprises an embedded positioning system; and
the one or more processors are coupled to the embedded positioning system and further configured to perform operations including:
obtaining third information indicative of a current geographic position of the device from the embedded positioning system;
when a geographic position of the merchant falls within a threshold distance of the current geographic position of the device, generating and transmitting a request to obtain the first information to the computing system; and
receiving the second information from the computing system in response to the request.

8. The device of claim 1, wherein the one or more processors are further configured to perform operations including:
detecting, via the communications interface, the wireless signal broadcast by the terminal device;
establishing a proximity of the device to the terminal device based on the detection of the wireless signal; and
based on the established proximity, generating and presenting, via the display unit, the first and second interface elements within the corresponding interface.

9. The device of claim 1, wherein the one or more processors are further configured to perform operations including:
detecting, via the communications interface, the wireless signal broadcast by the terminal device;
in response to the detection of the wireless signal, establishing communications with the terminal device; and transmitting, to the terminal device via the communications interface, second information instructing the terminal device to present at least the one of the first or second interface elements within an additional digital interface.

10. The device of claim 1, wherein:
the device is operable by a customer of the merchant; and
the one or more processors are further configured to perform operations including presenting the first and second interface elements within the digital interface and modifying the visual characteristic of the first interface element without intervention from the customer that operates the device.

11. A computer-implemented method, comprising:
based on a detection of a wireless signal broadcasted by a terminal device of a merchant, presenting, using at least one processor of a communications device, first and second interface elements within a digital interface, the first interface element having a visual characteristic that reflects a risk level of the merchant, and the second interface element identifying a payment instrument consistent with the risk level; and
receiving, using the at least one processor, first information associated with a change in the risk level of the merchant; and
using the at least one processor, modifying the visual characteristic of the first interface element to reflect the change in the risk level.

12. The computer-implemented method of claim 11, wherein the first interface element comprises a graphical icon, the graphical icon having the visual characteristic that reflects the determined risk level, and the visual characteristic comprising a color of the graphical icon.

13. The computer-implemented method of claim 12, wherein the graphical icon provides a graphical representation of the risk level, and the computer-implemented method further comprises:
establishing, using the at least one processor, the visual characteristic for the graphical icon in accordance with the risk level of the merchant; and
presenting, using the at least one processor, the graphical icon in accordance with the established visual characteristic; and
modifying, using the at least one processor, the visual characteristic of the graphical icon to reflect the change in the risk level.

14. The computer-implemented method of claim 11, further comprising:
receiving, from a computing system, and using the at least one processor, second information indicative of one or more prior instances of fraudulent activity involving the merchant; and
determining, using the at least one processor, the risk level of the merchant based on the first information, the risk level being indicative of a probability of future instances of fraudulent activity involving the merchant.

15. The computer-implemented method of claim 14, wherein:
the first information identifies one or more additional instances of fraudulent activity involving the merchant, each of the one or more additional instances of fraudulent activity occurring subsequent to the one or more prior instances; and
the computer-implemented method further comprises:
determining, using the at least one processor, a modified risk level for the merchant based on the first and second information; and
modifying, using the at least one processor, the visual characteristic of the first interface element in accordance with the modified risk level.

16. The computer-implemented method of claim 14, further comprising:
obtaining, using the at least one processor, third information indicative of a current geographic position of the communications device from an embedded positioning system of the communications device, the embedded positioning system being coupled to the at least one processor;
when a geographic position of the merchant falls within a threshold distance of the current geographic position of the communications device, generating and transmitting, using the at least one processor, a request to obtain the first information to the computing system; and
receiving, using the at least one processor, the second information from the computing system in response to the request.

17. The computer-implemented method of claim 11, further comprising:
detecting, using the at least one processor, the wireless signal broadcast by the terminal device;
establishing, using the at least one processor, a proximity of the communications device to the terminal device based on the detection of the wireless signal; and
based on the established proximity, generating and presenting, using the at least one processor, the first and second interface elements within the corresponding interface.

18. The computer-implemented method of claim 11, further comprising:
detecting, using the at least one processor, the wireless signal broadcast by the terminal device;
in response to the detection of the wireless signal, establishing communications with the terminal device using the at least one processor; and
using the at least one processor, transmitting, to the terminal device, second information instructing the terminal device to present at least the one of the first or second interface elements within an additional digital interface.

19. The computer-implemented method of claim 11, wherein:
the communications device is operable by a customer of the merchant; and
the presenting comprises presenting the first and second interface elements within the digital interface without intervention from the customer that operates the communications device; and
the modifying comprises modifying the visual characteristic of the first interface element without intervention from the customer that operates the communications device.

20. A tangible, non-transitory computer-readable medium storing instructions that, when executed by at least one processor, cause the at least one processor to perform a method, comprising:
based on a detection of a wireless signal broadcasted by a terminal device of a merchant, presenting first and second interface elements within a digital interface, the first interface element having a visual characteristic that reflects a risk level of the merchant, and the second interface element identifying a payment instrument consistent with the risk level; and
receiving first information associated with a change in the risk level of the merchant; and modifying the visual characteristic of the first interface element to reflect the change in the risk level.

\* \* \* \* \*